(12) United States Patent
Dankberg et al.

(10) Patent No.: US 8,005,034 B2
(45) Date of Patent: Aug. 23, 2011

(54) SCALABLE SATELLITE DEPLOYMENT

(75) Inventors: Mark D. Dankberg, Encinitas, CA (US); Aniruddha Das, San Diego, CA (US)

(73) Assignee: ViaSat, Inc., Carlsbad, CA (US)

( * ) Notice: Subject to any disclaimer, the term of this patent is extended or adjusted under 35 U.S.C. 154(b) by 748 days.

(21) Appl. No.: 12/080,968

(22) Filed: Jan. 9, 2008

(65) Prior Publication Data

US 2008/0247351 A1 Oct. 9, 2008

Related U.S. Application Data

(60) Provisional application No. 60/956,113, filed on Aug. 15, 2007, provisional application No. 60/884,143, filed on Jan. 9, 2007, provisional application No. 60/884,134, filed on Jan. 9, 2007, provisional application No. 60/884,146, filed on Jan. 9, 2007, provisional application No. 60/884,142, filed on Jan. 9, 2007, provisional application No. 60/884,153, filed on Jan. 9, 2007, provisional application No. 60/884,190, filed on Jan. 9, 2007, provisional application No. 60/884,181, filed on Jan. 9, 2007, provisional application No. 60/884,180, filed on Jan. 9, 2007, provisional application No. 60/884,150, filed on Jan. 9, 2007, provisional application No. 60/884,152, filed on Jan. 9, 2007, provisional application No. 60/884,139, filed on Jan. 9, 2007, provisional application No. 60/884,147, filed on Jan. 9, 2007, provisional application No. 60/884,182, filed on Jan. 9, 2007, provisional application No. 60/884,130, filed on Jan. 9, 2007, provisional application No. 60/884,188, filed on Jan. 9, 2007, provisional application No. 60/884,140, filed on Jan. 9, 2007, provisional application No. 60/884,137, filed on Jan. 9, 2007, provisional application No. 60/884,156, filed on Jan. 9, 2007, provisional application No. 60/884,136, filed on Jan. 9, 2007, provisional application No. 60/884,138, filed on Jan. 9, 2007, provisional application No. 60/884,120, filed on Jan. 9, 2007, provisional application No. 60/884,210, filed on Jan. 9, 2007.

(51) Int. Cl.
*H04W 4/00* (2009.01)
(52) U.S. Cl. ...................................... 370/315; 455/427
(58) Field of Classification Search .................. None
See application file for complete search history.

(56) References Cited

U.S. PATENT DOCUMENTS 5,233,626 A 8/1993 Ames
(Continued)

FOREIGN PATENT DOCUMENTS

EP 1 608 085 A 12/2005
(Continued)

OTHER PUBLICATIONS

Kaiser, Thomas et al., "Smart Antennas—State of the Art,"EURASIP, no date, 1 page.
(Continued)

*Primary Examiner* — Anh-Vu Ly
(74) *Attorney, Agent, or Firm* — Kilpatrick Townsend & Stockton LLP

(57) ABSTRACT

A scalable subscriber terminal for bi-directional communication with a gateway through one or more satellites is provided according to another embodiment of the invention. The scalable subscriber terminal may comprise a plurality of antennas and be configured to operate in at least a first communication mode prior to switching to a second communication mode. The first communication mode may comprise communicating with the gateway through a first satellite. The second communication mode may include communicating with the gateway through the first satellite and a second transceiver. The scalable subscriber terminal may download MIMO operational firmware from the gateway through the first satellite prior to switching to the second communication mode. The first communication mode may be a SISO or SIMO mode. The second communication mode may be a MISO or MIMO mode. The second transceiver may be a second satellite or a terrestrial repeater.

11 Claims, 32 Drawing Sheets

U.S. PATENT DOCUMENTS

| | | | |
|---|---|---|---|
| 5,319,673 | A | 6/1994 | Briskman |
| 5,864,579 | A | 1/1999 | Briskman |
| 5,867,109 | A * | 2/1999 | Wiedeman .................... 370/328 |
| 5,907,541 | A * | 5/1999 | Fairholm et al. .............. 370/316 |
| 5,995,495 | A | 11/1999 | Sampson |
| 6,351,499 | B1 | 2/2002 | Paulraj et al. |
| 6,549,774 | B1 | 4/2003 | Titlebaum et al. |
| 6,570,858 | B1 | 5/2003 | Emmons, Jr. et al. |
| 6,927,736 | B1 | 8/2005 | Kornbau |
| 6,944,139 | B1 | 9/2005 | Campanella |
| 6,954,446 | B2 | 10/2005 | Kuffner |
| 6,975,600 | B1 | 12/2005 | Vaughan et al. |
| 7,142,864 | B2 | 11/2006 | Laroia et al. |
| 7,203,490 | B2 | 4/2007 | Karabinis et al. |
| 7,260,369 | B2 | 8/2007 | Feher |
| 7,280,810 | B2 | 10/2007 | Feher |
| 7,634,232 | B2 * | 12/2009 | Waxman ...................... 455/63.1 |
| 2002/0008412 | A1 | 1/2002 | Patz et al. |
| 2002/0032003 | A1 | 3/2002 | Avitzour et al. |
| 2002/0123344 | A1 | 9/2002 | Criqui |
| 2003/0058834 | A1 | 3/2003 | Soulie et al. |
| 2003/0181159 | A1 | 9/2003 | Heinerscheid et al. |
| 2004/0072539 | A1 | 4/2004 | Monte et al. |
| 2004/0110468 | A1 | 6/2004 | Perlman |
| 2004/0165689 | A1 | 8/2004 | Akopian et al. |
| 2005/0042999 | A1 | 2/2005 | Rappaport |
| 2005/0141644 | A1 | 6/2005 | Sadowsky |
| 2005/0162306 | A1 | 7/2005 | Babitch et al. |
| 2005/0181752 | A1 | 8/2005 | Sahota |
| 2005/0227631 | A1 * | 10/2005 | Robinett ...................... 455/168.1 |
| 2005/0265273 | A1 | 12/2005 | Karabinis et al. |
| 2005/0281221 | A1 | 12/2005 | Roh et al. |
| 2006/0009177 | A1 | 1/2006 | Persico et al. |
| 2006/0165120 | A1 | 7/2006 | Karabinis |
| 2006/0273967 | A1 | 12/2006 | Gat |
| 2006/0280262 | A1 | 12/2006 | Malludi |
| 2007/0030116 | A1 | 2/2007 | Feher |
| 2007/0032220 | A1 | 2/2007 | Feher |
| 2007/0032246 | A1 | 2/2007 | Feher |
| 2007/0032266 | A1 | 2/2007 | Feher |
| 2007/0032832 | A1 | 2/2007 | Feher |
| 2007/0153731 | A1 | 7/2007 | Fine |
| 2007/0155319 | A1 | 7/2007 | Monte et al. |
| 2007/0167187 | A1 | 7/2007 | Rezvani et al. |
| 2007/0184849 | A1 * | 8/2007 | Zheng ......................... 455/456.1 |
| 2007/0202890 | A1 | 8/2007 | Feher |
| 2007/0238483 | A1 | 10/2007 | Boireau et al. |
| 2008/0089269 | A1 | 4/2008 | Tsutsui |
| 2008/0261522 | A1 | 10/2008 | Dankberg et al. |
| 2009/0034448 | A1 | 2/2009 | Miller et al. |

FOREIGN PATENT DOCUMENTS

| | | |
|---|---|---|
| KR | 97-007605 | 2/1994 |
| KR | 1994-0013241 | 6/1994 |
| KR | 1999-0072064 | 9/1999 |
| KR | 10-2004-0019952 | 3/2004 |
| WO | WO 01/33738 A | 5/2001 |
| WO | WO 01/45300 A | 6/2001 |
| WO | WO 2006/018678 A | 2/2006 |

OTHER PUBLICATIONS

Liolis, Konstantinos P. et al., "Multi-Satellite MIMO Communications at Ku-Band and Above: Investigations on Spatial Multiplexing for Capacity Improvement and Selection Diversity for Interface Mitigation, "EURASIP Journal on Wireless Communication and Networking, Hindawi Publishing Co., vol. 2007, Article ID59608, 11 pages.

Mietzner, Jan et al., "Distributed Space-Time Codes for Cooperative Wireless Networks in the Presence of Different Propagation Delays and Path Losses," Proc. 3rd IEEE Sensor Array Multichannel Signal Processing Workshop (SAM 2004), Sitges, Barcelona, Spain, Jul. 2005, 6 pages.

Cummings, M. et al., "Mode Switching and Software Download for Software Defined Radio: The SDR Forum Approach", IEEE Communications Magazine, Aug. 1, 1999, pp. 104-106, vol. 37, No. 8, IEEE Service Center, Piscataway, US.

Dagres, L. et al., "Flexible-Radio: A General Framework with PHY-layer algorithm-design insights", The International Conference on Belgrade, Serbia and Montenegro Nov. 21-24, 2005. Computer as a Tool, 2005, Eurocon 2005, Nov. 21, 2005, pp. 120-123, vol. 1, IEEE Piscataway, US.

Yamashita, F. et al., "Broadband Multiple Satellite MIMO System", Vehicular Technology Conference, 2005, Sep. 25, 2005, pp. 2632-2636, vol. 4, IEEE Piscataway, US.

Non-Final Office Action of Mar. 16, 2011 for U.S. Appl. No. 11/971,852; 21 pages.

Supplemental Notice of Allowability of Mar. 9, 2011 for U.S. Appl. No. 11/818,972; 3 pages.

Notice of Allowance of Feb. 17, 2011 for U.S. Appl. No. 11/818,972; 7 pages.

Non-Final Office Action of Aug. 30, 2010 for U.S. Appl. No. 11/818,972; 12 pages.

International Search Report and Written Opinion for PCT Application No. PCT/US2008/050620 mailed on Oct. 23, 2008; 16 pages.

International Search Report and Written Opinion for PCT Application No. PCT/US2008/050621 mailed on Jun. 11, 2008; 10 pages.

International Search Report and Written Opinion for PCT Application No. PCT/US2008/050623 mailed on Jun. 27, 2008; 10 pages.

* cited by examiner

SCALABLE SATELLITE DEPLOYMENT

CROSS-REFERENCES TO RELATED APPLICATIONS

This application is a non-provisional, and claims the benefit, of the following commonly assigned U.S. Provisional Patent Applications, which are all incorporated by references for all purposes:

U.S. Provisional Patent Application No. 60/884,143, filed Jan. 9, 2007 entitled "MIMO Satellite Subscriber Terminal";

U.S. Provisional Patent Application No. 60/884,134, filed Jan. 9, 2007 entitled "Dynamic Switching Between Antennas";

U.S. Provisional Patent Application No. 60/884,146, filed Jan. 9, 2007 entitled "Antenna Configuration for Wireless Multipath Signal Reception of Satellite Signals";

U.S. Provisional Patent Application No. 60/884,142, filed Jan. 9, 2007 entitled "MIMO Antenna with Gain on Horizon for Satellite Communications";

U.S. Provisional Patent Application No. 60/884,153, filed Jan. 9, 2007 entitled "Satellite Terrestrial Hybrid with Additional Content on Terrestrial";

U.S. Provisional Patent Application No. 60/884,190, filed Jan. 9, 2007 entitled "Use of Different Coding and Modulation for Satellite MIMO";

U.S. Provisional Patent Application No. 60/884,181, filed Jan. 9, 2007 entitled "Satellite Terrestrial Hybrid Using Same Frequency and MIMO";

U.S. Provisional Patent Application No. 60/884,180, filed Jan. 9, 2007 entitled "Two Satellites on Same Frequency to MIMO Subscriber Terminals";

U.S. Provisional Patent Application No. 60/884,150, filed Jan. 9, 2007 entitled "Coordinated Multiple Antenna Array for MIMO Communication with Satellite and Terrestrial Signals";

U.S. Provisional Patent Application No. 60/884,152, filed Jan. 9, 2007 entitled "Multi-Antenna System with Wireless Interface to Vehicle";

U.S. Provisional Patent Application No. 60/884,139, filed Jan. 9, 2007 entitled "Dynamic Switching between Different Sets of Antennas and Associated Subscriber Terminals";

U.S. Provisional Patent Application No. 60/884,147, filed Jan. 9, 2007 entitled "Base Station Reduction in Mobile Satellite Systems";

U.S. Provisional Patent Application No. 60/884,182, filed Jan. 9, 2007 entitled "Delay Tolerant MIMO Using Rolling Pilots";

U.S. Provisional Patent Application No. 60/884,130, filed Jan. 9, 2007 entitled "Directional Analog Beam Forming";

U.S. Provisional Patent Application No. 60/884,188, filed Jan. 9, 2007 entitled "Switch Transceiver Between One MIMO or Independent SISO";

U.S. Provisional Patent Application No. 60/884,140, filed Jan. 9, 2007 entitled "MIMO Antenna with Polarization Diversity for Satellite Communications";

U.S. Provisional Patent Application No. 60/884,137, filed Jan. 9, 2007 entitled "Scalable Satellite Deployment";

U.S. Provisional Patent Application No. 60/884,156, filed Jan. 9, 2007 entitled "Signal Processing for Diverse Antenna Elements";

U.S. Provisional Patent Application No. 60/884,136, filed Jan. 9, 2007 entitled "Signal Scanning for Determination of Dynamic Switching Between Antennas";

U.S. Provisional Patent Application No. 60/884,138, filed Jan. 9, 2007 entitled "State Based Dynamic Switching Between Antennas";

U.S. Provisional Patent Application No. 60/884,120, filed Jan. 9, 2007 entitled "Layered Space-Time Processing";

U.S. Provisional Patent Application No. 60/884,210, filed Jan. 9, 2007 entitled "MIMO Mobile Satellite System"; and U.S. Provisional Patent Application No. 60/956,113, filed Aug. 15, 2007 entitled "Satellite MIMO System".

BACKGROUND

This disclosure relates without limitation to satellite communication and to scalable satellite communication during satellite deployment among other things.

Bi-directional satellite data delivery systems are becoming increasingly popular. Assuring signal communication is difficult in satellite systems. This is especially true for mobile applications that have size and power constraints. More powerful satellites that could increase link margin with a more powerful signal are costly to deploy and maintain.

Conventional satellite systems operate in single input single output (SISO) mode and focus on direct links between the satellite and subscriber terminal. Diversity has been used to increase link margin. The same signal may be sent through two physically distinct paths such that the subscriber terminal can choose the strongest signal or even combine the two signals.

Satellite systems suffer from obstructions and fading in certain circumstances. A line-of-sight to the satellite is required for a communication link. In cities and forests, buildings, trees and other obstructions can interfere with the data stream. Some satellite radio providers have used terrestrial repeaters that rebroadcast the same signal using a different frequency. When the satellite radio signal is obstructed, the same content can alternatively be received using the terrestrial repeater.

BRIEF SUMMARY

A scalable satellite system is provided according to one embodiment of the invention. This system is initially designed to operate with a single orbital transceiver and after deployment of the single orbital transceiver, a second orbital transceiver can be added to increase throughput and/or diversity gain. The two orbital transceivers operate cooperatively to increase diversity gain.

A terminal with a plurality of transceivers is provided according to one embodiment of the invention that operate in a first mode where the plurality of transceivers operate with a single multiple-input multiple-output (MIMO) link. The system may switch from the first mode to a second mode where two links are serviced by the plurality of transceivers. The two links could include MIMO and/or SISO links.

A scalable subscriber terminal for bi-directional communication with a gateway through one or more satellites is provided according to another embodiment of the invention. The scalable subscriber terminal may comprise a plurality of antennas and be configured to operate in at least a first communication mode prior to switching to a second communication mode. The first communication mode may comprise communicating with the gateway through a first satellite. The second communication mode may include communicating with the gateway through the first satellite and a second transceiver. The scalable subscriber terminal may download MIMO operational firmware from the gateway through the first satellite prior to switching to the second communication mode. The first communication mode may be a SISO or SIMO mode. The second communication mode may be a MISO or MIMO mode. The second transceiver may be a second satellite or a terrestrial repeater.

A method for switching a communication link at a subscriber terminal from a SIMO satellite communication link to a MIMO satellite communication link is provided according to another embodiment of the invention. The method may include communicating with a gateway through a first satellite using SIMO techniques. An indication of the presence of a second transceiver may be received at the subscriber terminal from the gateway through the first satellite. The subscriber terminal may then communicate with the gateway through at least the first satellite and the second transceiver using MIMO techniques. The method may also include downloading MIMO-compatible firmware to the subscriber terminal from the gateway through the first satellite and loading the MIMO-compatible firmware at the subscriber terminal. The second transceiver may include a terrestrial repeater or a second satellite.

A satellite communication system for bi-directional communication is also provided according to another embodiment of the invention. The satellite communication system may comprise a gateway, a first orbital transceiver, a plurality of subscriber terminals and a second orbital transceiver. The first orbital transceiver may be configured to communicate with the gateway. The plurality of subscriber terminals may include a plurality of antennas that are configured to communicate with the gateway over the first orbital transceiver using SIMO techniques. The second orbital transceiver may be configured to communicate with the gateway. The gateway may be initially configured to communicate with the plurality of subscriber terminals over the first orbital transceiver. The gateway is configured to communicate with the plurality of subscriber terminals over the first orbital transceiver and the second orbital transceiver using MIMO techniques in response to a communication event. The communication event may include establishing a communication link between the gateway and the second satellite.

A method for scaling a satellite communication link from a SIMO link to a MIMO link is provided according to another embodiment of the invention. The satellite communication link provides communication between a gateway and one or more subscriber terminals through one or more satellites. The method may include communicating with the one or more subscriber terminals through a first communication mode that includes communicating with the one or more subscriber terminals through a first satellite using SIMO techniques. The gateway may then establish communication between the gateway and a second satellite. MIMO-compatible firmware may be transmitted to the one or more subscriber terminals through the first satellite and the MIMO compatible firmware may be loaded on the one or more subscriber terminals. Communication may then occur with the one or more subscriber terminals through a second communication mode that includes communicating with the one or more subscriber terminals through a first satellite and a second satellite using MIMO techniques.

Further areas of applicability of the present disclosure will become apparent from the detailed description provided hereinafter. It should be understood that the detailed description and specific examples, while indicating various embodiments, are intended for purposes of illustration only and do not limit the scope of the disclosure.

Figure 1A:
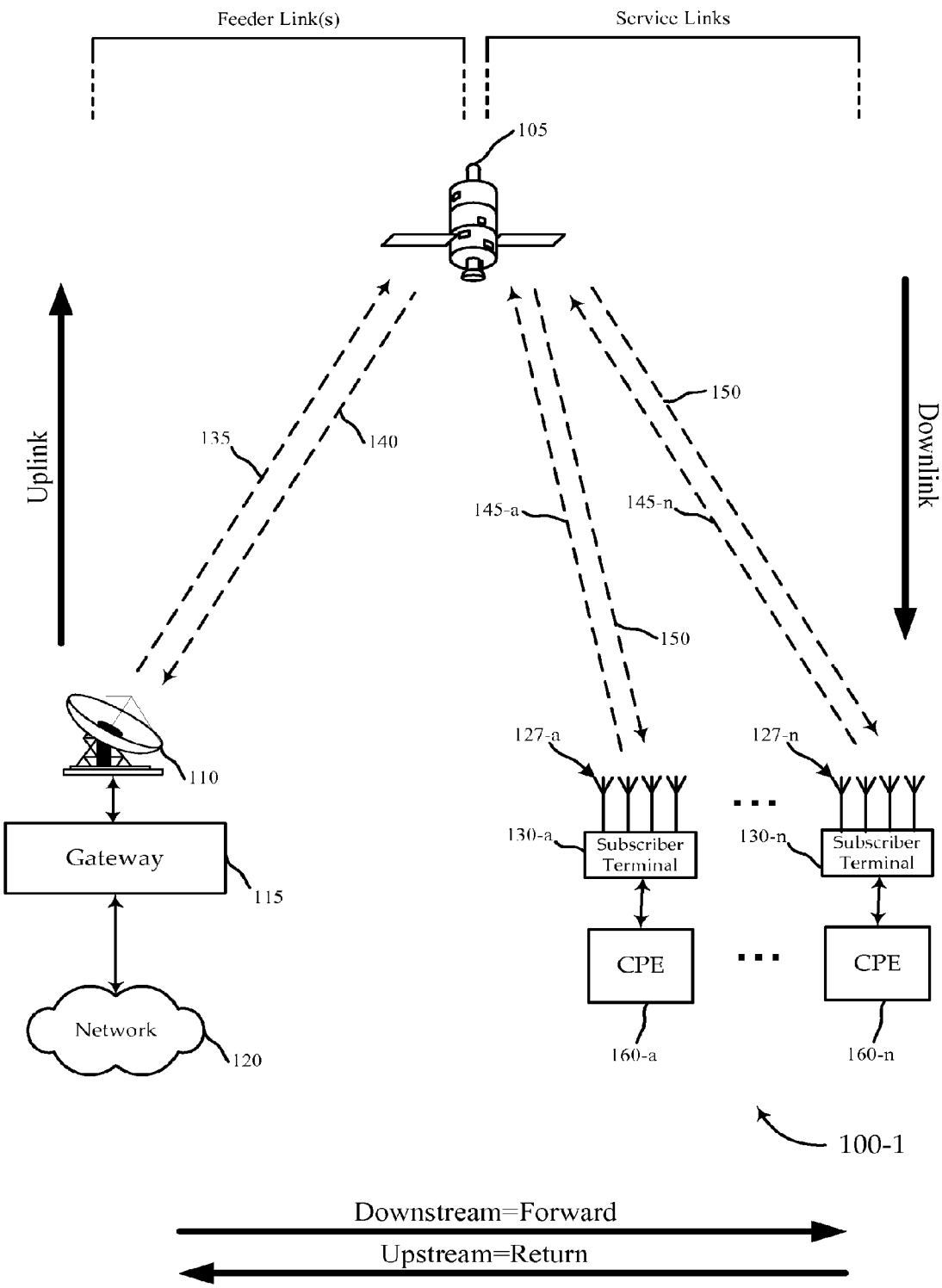
FIGS. 1A-1D depict block diagrams of embodiments of a satellite system.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It being understood that various changes may be made in the function and arrangement of elements without departing from the spirit and scope as set forth in the appended claims.

Section I

Embodiments of the present invention are directed towards various satellite MIMO communication schemes. For example, according to one embodiment of the invention, a satellite communication system includes a plurality of subscriber terminals, a satellite and a gateway. The plurality of subscriber terminals are in communication with the gateway over a satellite link using SIMO techniques. One or more of the subscriber terminals include one or more transceivers and/or antenna. The operators of the satellite system may upgrade the system from a SIMO to a MIMO system by introducing a second satellite. Inclusion of such a satellite may provide increases in diversity for the signal. In other embodiments of the invention the satellite system upgrades from a SISO to a MIMO, MISO and/or SIMO system upon introduction of a second satellite. Moreover, in some embodiments of the invention, while a satellite system is upgraded from SISO system to a MIMO, MISO and/or SIMO system, one or more subscriber terminals may continue to operate as a SISO subscriber terminal.

Thus, subscriber terminals and gateways may operate in a SIMO mode prior to introduction of the second satellite. A second satellite may be launched and/or the rights to use a second satellite may purchased. After introduction of the second satellite, the system may operate in a MIMO mode. In order to do so, the firmware may be downloaded from the gateway to the subscriber terminals over the first satellite in order for the subscriber terminals to operate in MIMO mode. In some embodiments, such a firmware update may occur globally across all subscriber terminals. Thus, such a system may provide a communication link in SIMO or MISO mode until the second satellite is available. Once the second satellite is available, the system may switch to a MIMO mode or a partial MIMO mode. A system operates in partial MIMO mode when one or more subscriber terminals operate in MIMO mode while one or more subscriber terminals operate in SIMO, MISO or SISO mode.

Referring initially to FIG. 1A, an embodiment of a satellite system 100-1 is shown. Multiple antennas 127 of the subscriber terminal 130 allow MIMO techniques to be used. MIMO systems can operate with both spatial multiplexing and diversity benefits. In this embodiment, a gateway 115 is coupled with a network 120, for example, the Internet. The gateway 115 uses a satellite dish 110 to bi-directionally communicate with a satellite 105 on a feeder link. An upstream forward link 135 communicates information from the gateway 115 to the satellite 105, and a downstream return link 140 communicates information from the satellite 105 to the gateway 115. Although not shown, there may be a number of gateways 115 in the system 100.

The satellite 105 could perform switching or be a bent-pipe. Information bi-directionally passes through the satellite 105. The satellite 105 could use antennas or phased arrays when communicating. The communication could be focused into spot beams or more broadly cover a bigger geographical area, for example, the entire continental US (CONUS). Satellites 105 have trouble reaching subscriber terminals 130 through foliage or other obstructions. At certain frequencies, even weather and other atmospheric disturbances can cause a satellite signal to fade.

The subscriber terminals 130 in this embodiment are bi-directionally coupled to the satellite 105 to provide connectivity with the network 120. Each subscriber terminal 130 can receive information with a shared forward downlink 150 from the satellite 105, and transmitted information is sent on a number of return uplinks 145. Each subscriber terminal 130 can initiate a return uplink 145 to send information upstream to the satellite 105 and ultimately to the gateway 115.

This embodiment has multiple antennas on the subscriber terminal 130. The subscriber terminal 130 can be in a fixed location or can be mobile. In this embodiment, the subscriber terminal 130 interacts with a single transceiver in the satellite 105. Other embodiments could allow the subscriber terminal 130 to interact with multiple transceivers that may be orbitally located or non-orbitable (e.g., air, ground or sea based). Some embodiments of the subscriber terminal 130 allow switching between these modes.

The physical layer between the satellite and the subscriber terminal operates in SIMO for the downlink and MISO for the uplink. MISO and SIMO are two degenerated cases of MIMO, where MISO has a single transmitter with multiple receivers, and SIMO has a single receiver with multiple transmitters. Generally, MIMO involves multiple transmit and/or receive engines coupled to respective antennas. In various embodiments, the antennas are configured to have independent fading with a spacing distance of ¼, ½ or a full wavelength. The system 100 includes at least one of spatial multiplexing, transmit diversity methods (e.g., space-time coding, code reuse multiple access, etc.), and/or beamforming technologies. Various embodiments can use any number or permutation of these features in implementing the system 100.

Generally, transmission diversity sends some or all of the same information on two distinguishable channels. Physical separation, angular diversity, code division, frequency division, time division, or other techniques can be used to distinguish the channels and increase the gain. Spatial multiplexing generally allows greater throughput by sending partially or fully unique data down a number of channels in parallel. There is an interplay between increases in gain from use of diversity and increases in throughput using spatial multiplexing. For example, diversity can be emphasized to achieve increases in gain at the expense of throughput.

Figure 1B:
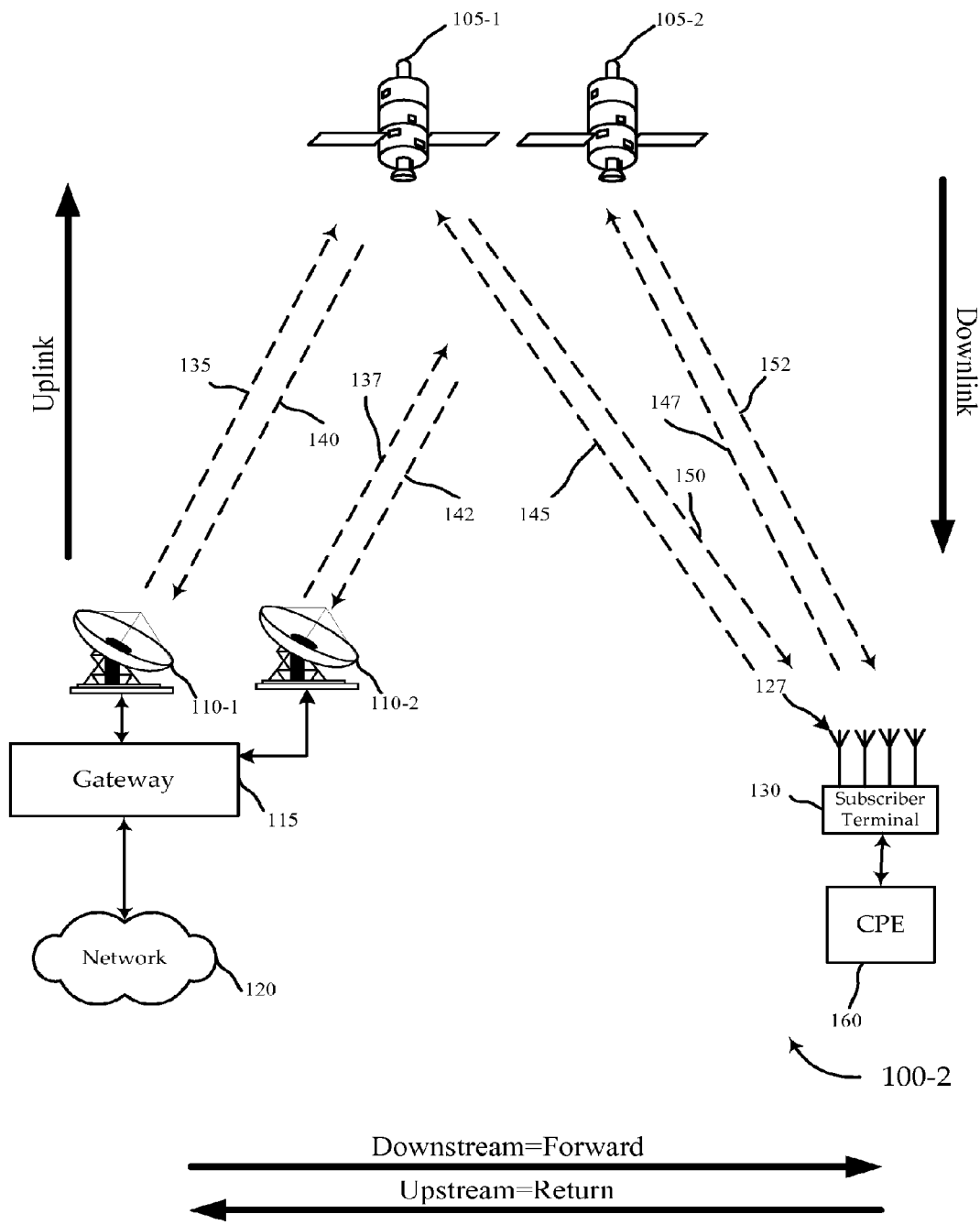

Referring next to FIG. 1B, another embodiment of a satellite system 100-2 is shown. This embodiment has two satellites 105 that act cooperatively as multiple transmitters and receivers in a MIMO configuration. The satellites 105 are geographically separated by orbit or orbital slot, but other techniques can be used to further achieve diversity. Low earth orbit (LEO), geostationary or elliptical orbits may be variously used by the satellites 105.

Figure 1C:
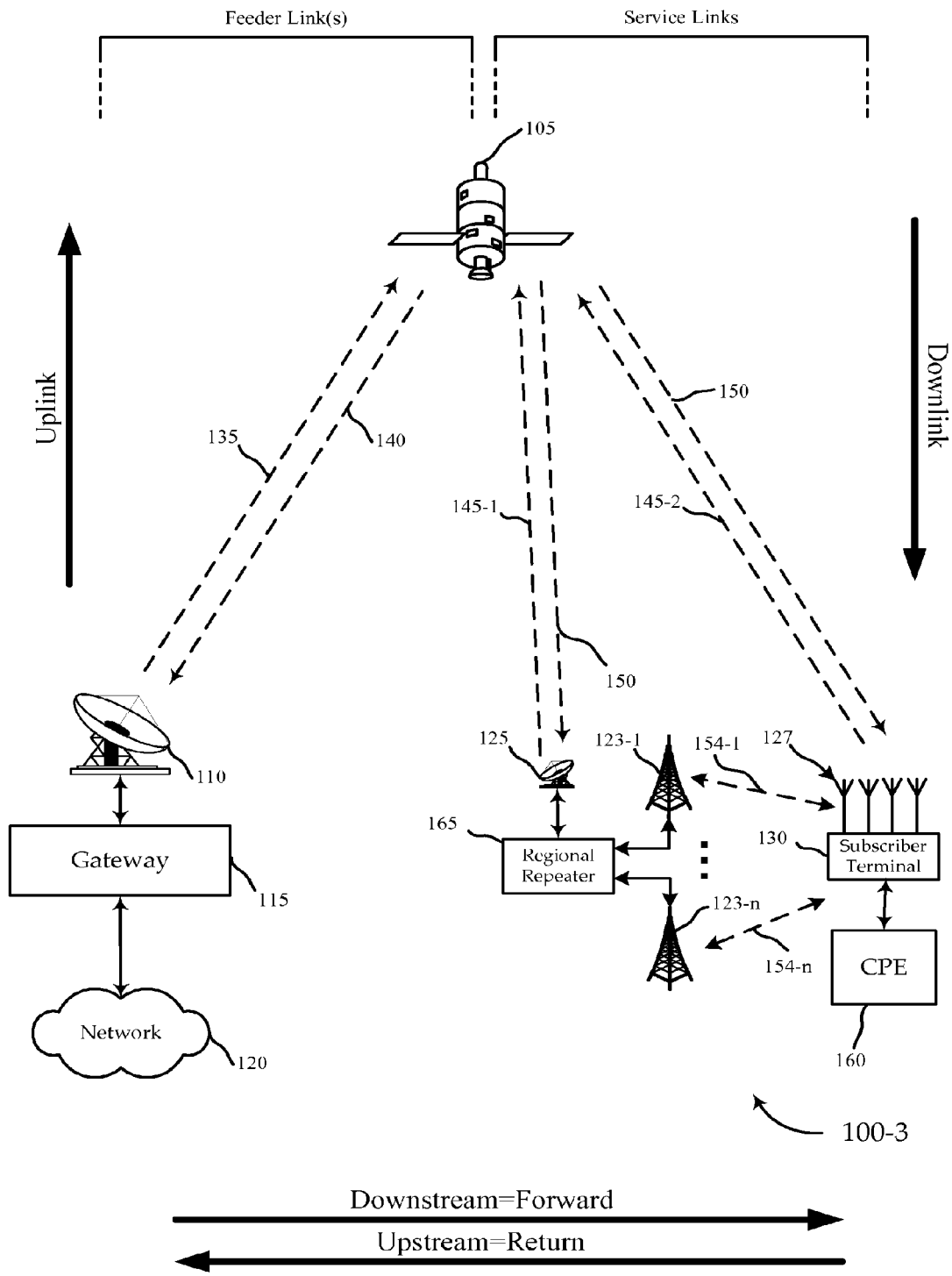

With reference to FIG. 1C, yet another embodiment of the satellite system 100-3 is shown. This embodiment uses a number of regional repeaters 165. The regional repeaters 165 are distributed around to allow enhanced coverage. At any given moment, a subscriber may be able to communicate with a few regional repeaters 165 and/or the satellite 105. A service link between the regional repeater antenna 125 and the satellite 105 allow relaying activity on a terrestrial link(s) 154. Some type of diversity is used to distinguish the satellite signal(s) from the repeater signal(s).

The subscriber terminal 130 achieves MIMO benefits by using both satellite(s) and regional repeater(s). The regional repeater 165 can be located anywhere sub-orbital (e.g., a balloon, an aircraft, ground-based, on buildings, ship-mounted, on a High Altitude Platform (HAP), etc.). This embodiment shows the regional repeater having a multiple terrestrial antenna 123, but other embodiments could have a single terrestrial antenna 123 for each regional repeater 165. Even though this embodiment only shows a single satellite 105, other embodiments could have multiple satellites 105.

Figure 1D:
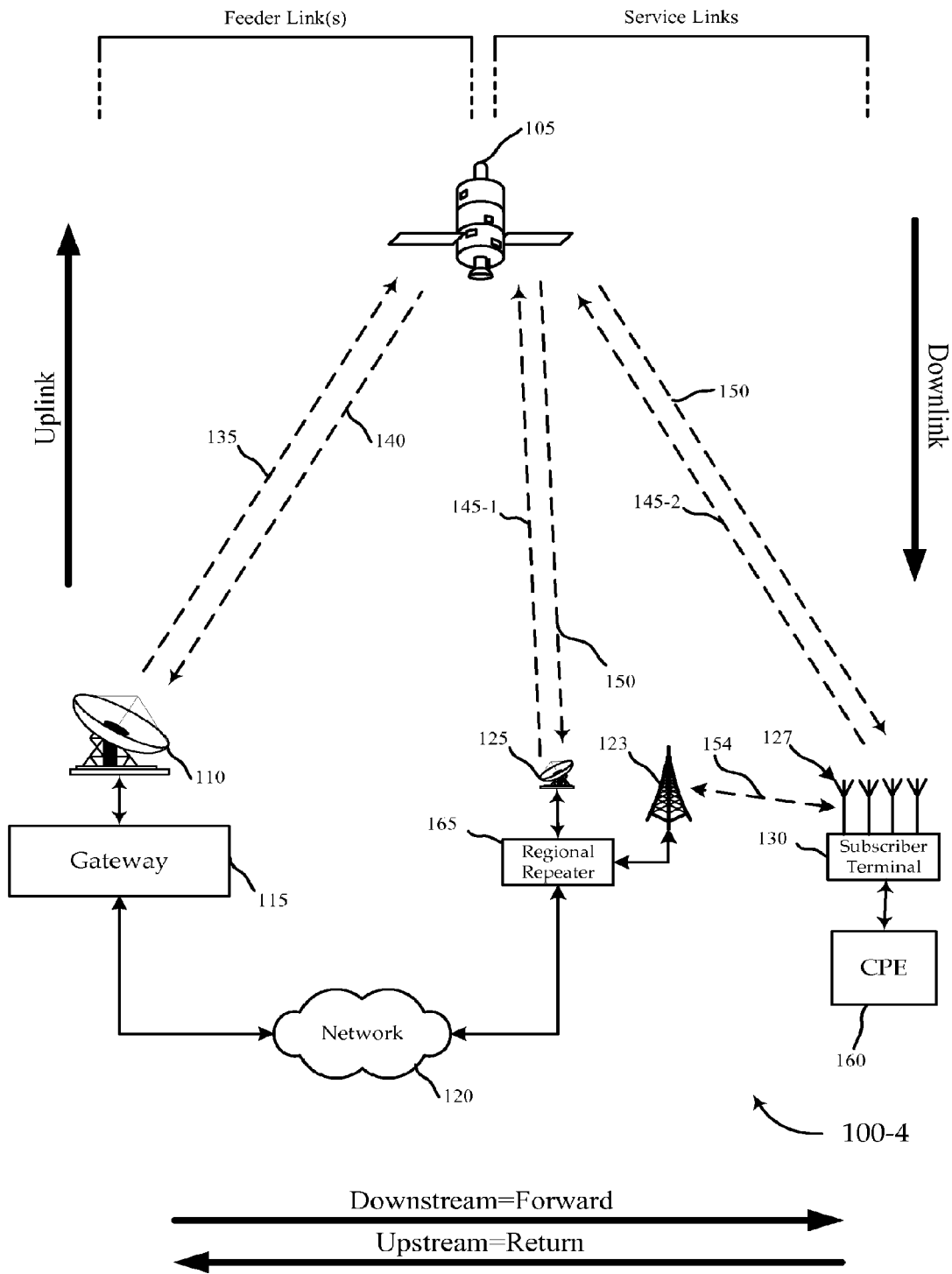

Referring to FIG. 1D, still another embodiment of the satellite system 100-4 is shown. This embodiment uses regional repeaters that can use either a service link 145-1, 150 or a network connection to relay communication of the terrestrial link 154. Each regional repeater 165 in this embodiment uses a single transceiver and antenna 123 for terrestrial communication. An algorithm can divide traffic between the service link and network link when both are available.

Satellites are often deployed with very little system flexibility. Conventional satellite systems operate in SISO mode such that a particular satellite, subscriber terminal and gateway all use a single communication pathway. Use of MIMO, SIMO and/or MISO allow diversity gains and/or spatial multiplexing.

In one embodiment, a first satellite 105 is deployed (e.g., FIG. 1A). At a later time, a second satellite 105 and/or a regional repeater 165 is added to the system 100 (e.g., FIG. 1B, 1C or 1D). Between the satellite and the subscriber terminal, the forward link changes from SIMO to MIMO and the return link changes MISO to MIMO once two links are possible. Old subscriber terminals 130 may be replaced to support MIMO or could be field upgraded, for example, with a firmware update.

The subscriber terminals 130 could have multiple transceivers initially that can change between a first mode that interacts with a single satellite 105, a second mode that includes two or more satellites 105, a third mode that includes both a satellite 105 and regional repeaters 165, and a fourth mode that includes two or more satellites 105 and regional repeaters 165. Some areas may not have a view of all satellites 105 or have regional repeaters 165. Those areas could have their subscriber terminals programmed to avoid modes not supported.

For a subscriber terminal 130, each transceiver could operate in a MIMO mode with m elements or SISO with n different transceivers. Generally, a SISO arrangement with different data on each link allows greater throughput, and MIMO with redundant information allows for diversity gain at the expense of throughput. There could have any number of permutations between some SISO channels and some MIMO channels. For example, for a 4 element MIMO you could switch to two independent two element MIMOs. Later, the 4 element MIMO could switch to a 2 element MIMO and two SIMO elements working independently.

Switching between SIMO and MIMO could be done for a number of reasons. In some embodiments of the invention switching from SIMO to MIMO occurs when a second satellite, terrestrial repeater, or a terrestrial antenna is included in the system. In other embodiments of the invention, where there is link margin available, the transceiver elements could reduce MIMO size to allow less data diversity and higher throughput. When error rates increase, more robust MIMO configurations could be used with greater data diversity. This reconfiguration could be done for the forward link or the return link.

The transceiver elements could be divided to differentiate traffic with different satellites 105 and/or regional repeaters 165. For example, the subscriber terminal 130 could be mobile and configured in a 4-element MIMO. When in range of two relays, the subscriber terminal 130 could switch to two MIMO elements for one relay (e.g., the satellite) and switch the other two MIMO elements to the other relay (e.g., base stations).

Satellite spot beams use a four color scheme to avoid overlap. When a mobile subscriber terminal 130 finds itself in an area with overlap, the MIMO could be rearranged to allow doubling throughput in the overlap areas. In another embodiment, the transceivers could be reconfigured to have some used for CONUS coverage and others for spot beam.

Figure 2A:
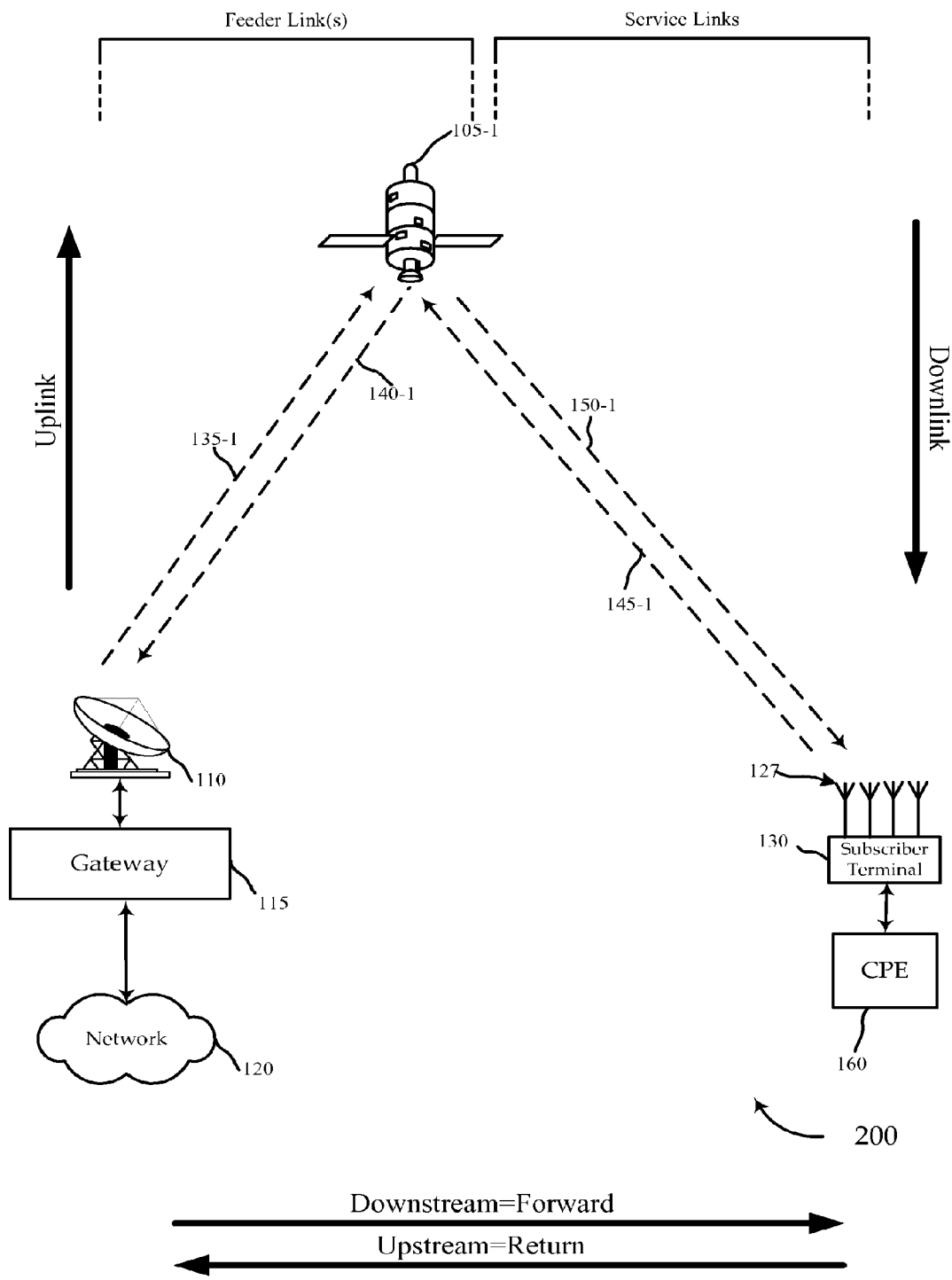
FIG. 2A depicts a subscriber terminal communicating with a gateway over a first satellite using SIMO techniques according to one embodiment of the invention.
Figure 2B:
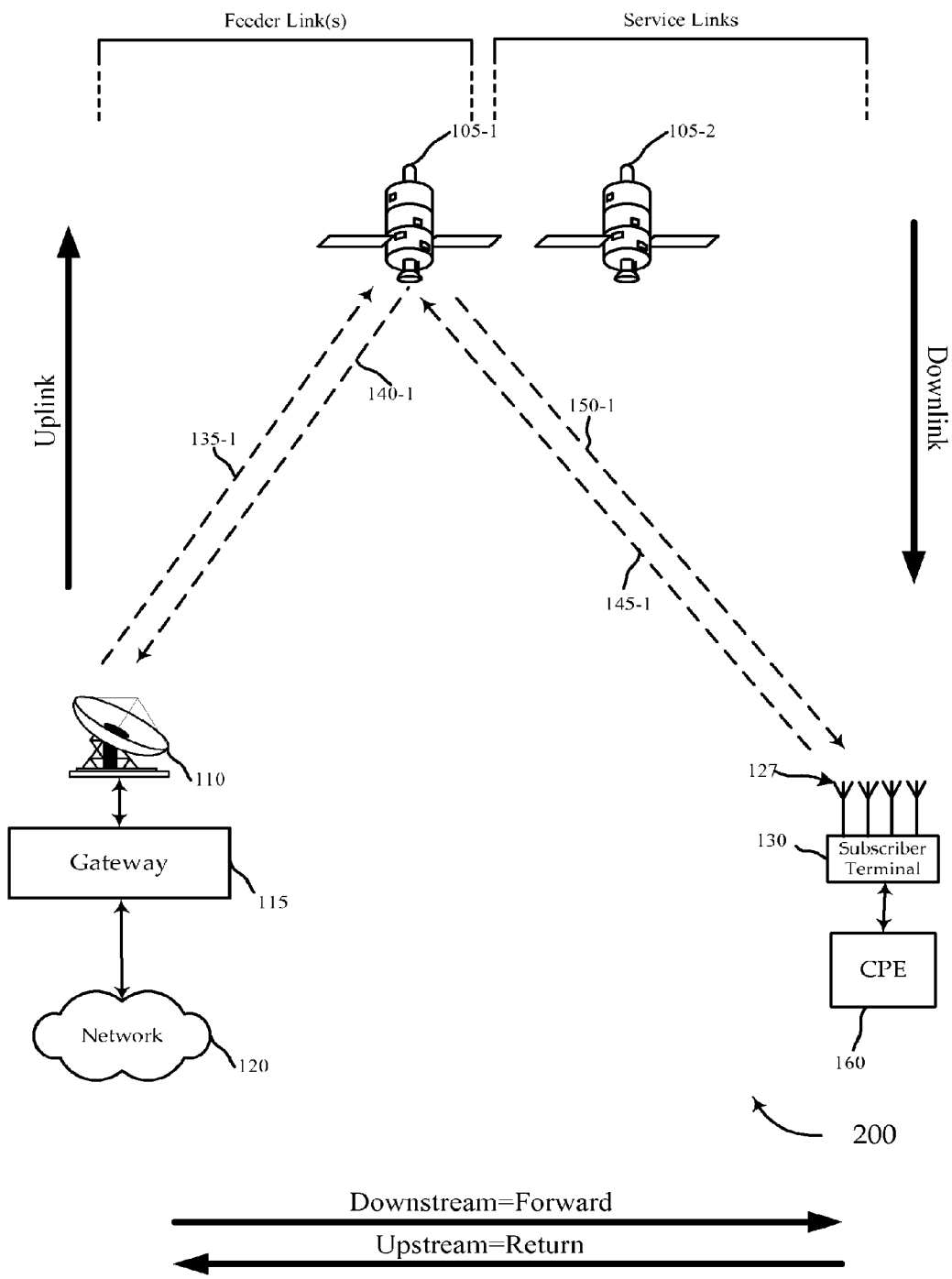
FIG. 2B depicts a subscriber terminal communicating with a gateway over a first satellite using SIMO techniques and the introduction of a second satellite according to one embodiment of the invention.
Figure 2C:
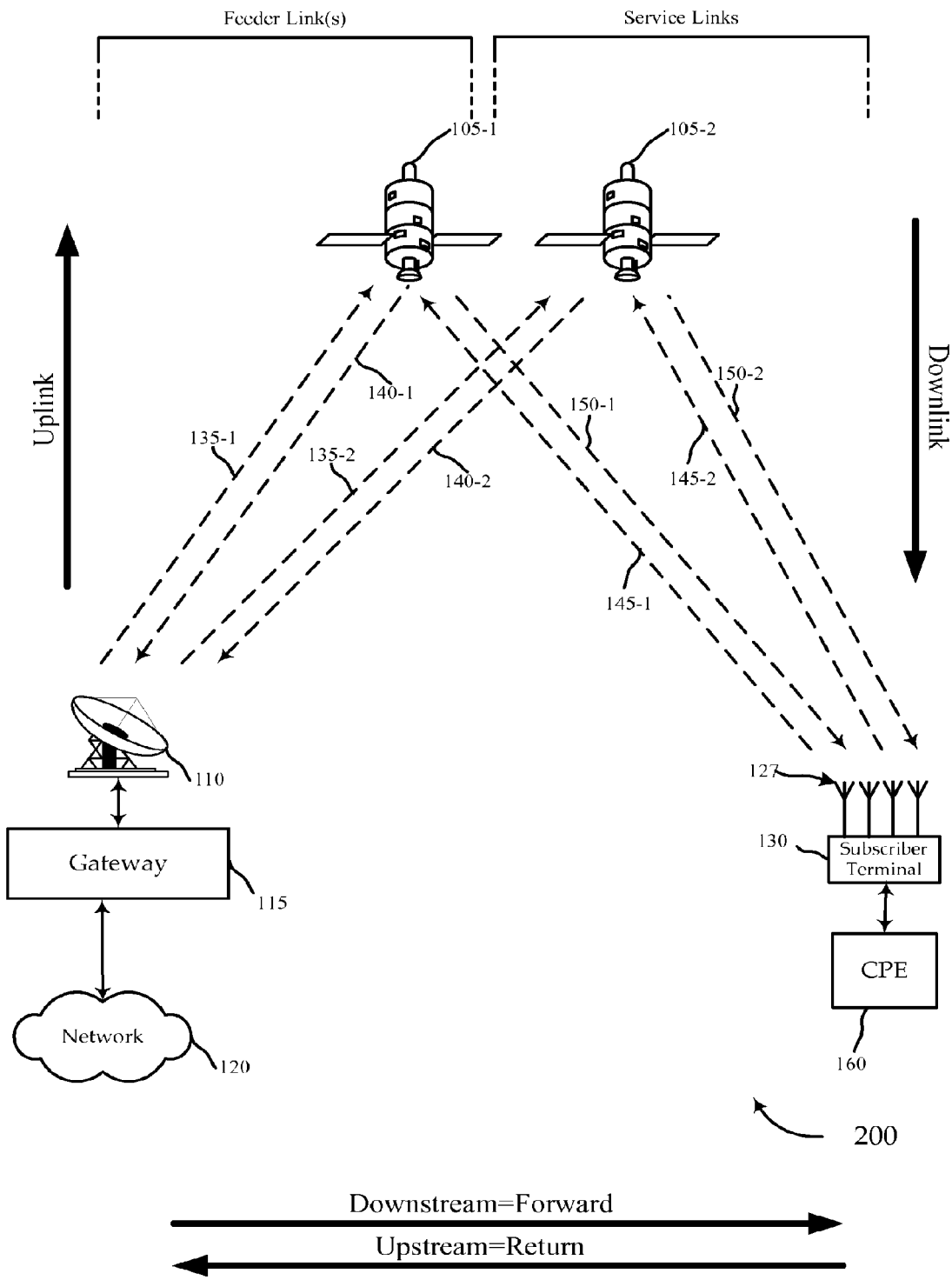
FIG. 2C depicts a subscriber terminal communicating with a gateway over a first and a second satellite using MIMO techniques according to one embodiment of the invention.

FIGS. 2A, 2B and 2C show a system deploying a first satellite 105-1 and then switching to system with two satellites according to one embodiment of the invention. FIG. 2A depicts a subscriber terminal 130 with a plurality of antennas 127 communicating with a gateway 115 over a first satellite 105-1 using SIMO and/or SISO techniques. FIG. 2B shows the introduction of a second satellite 105-2. FIG. 2C shows the subscriber terminal 130 communicating with the gateway 115 over the first and a second satellites 105-1, 105-2 using MIMO techniques. Thus, such an exemplary system may first communicate using SIMO and/or SISO techniques and may then communicate using MIMO techniques when the second satellite becomes available.

Figure 3A:
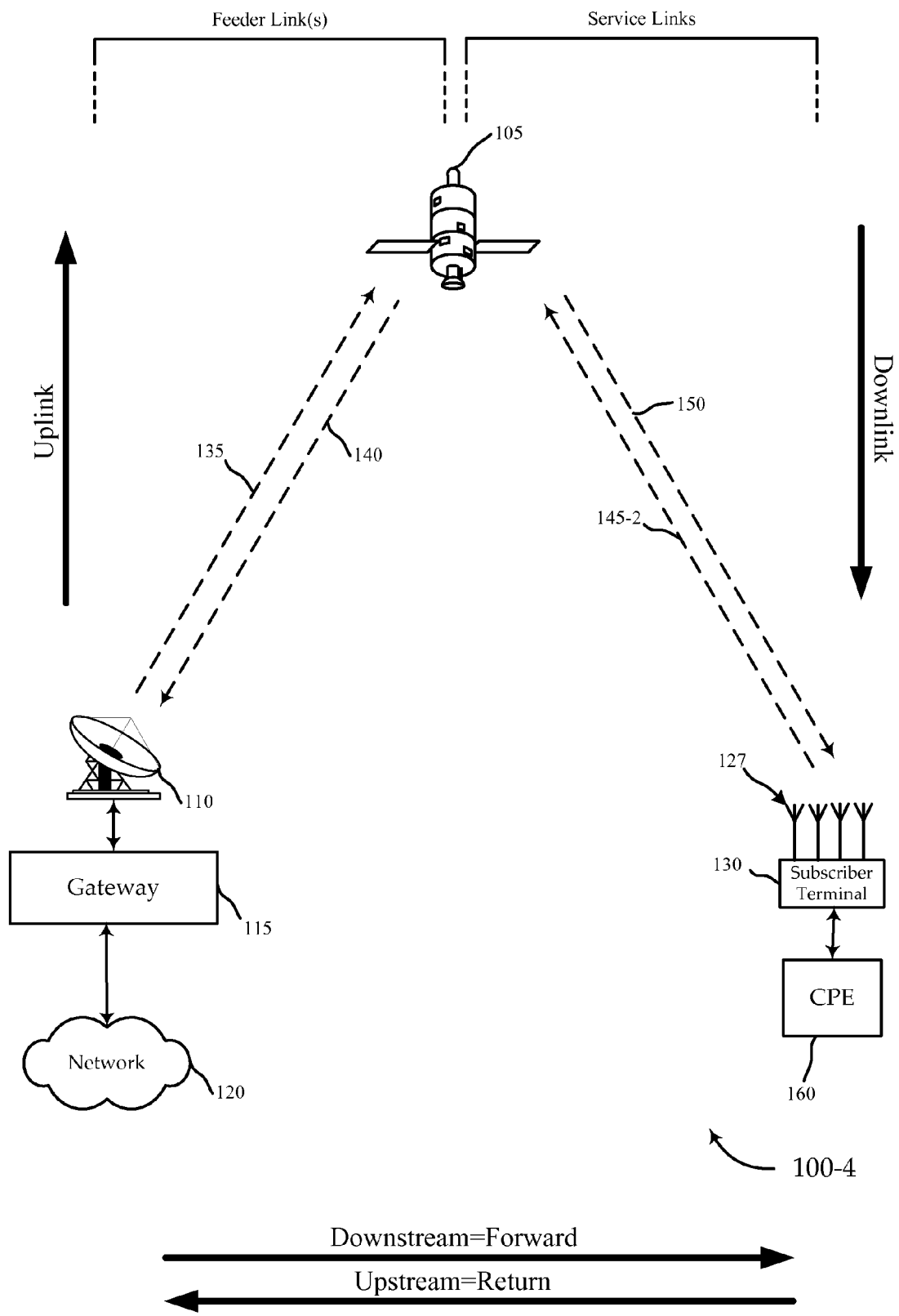
FIG. 3A depicts a subscriber terminal communicating with a gateway over a first satellite using SIMO techniques according to one embodiment of the invention.
Figure 3B:
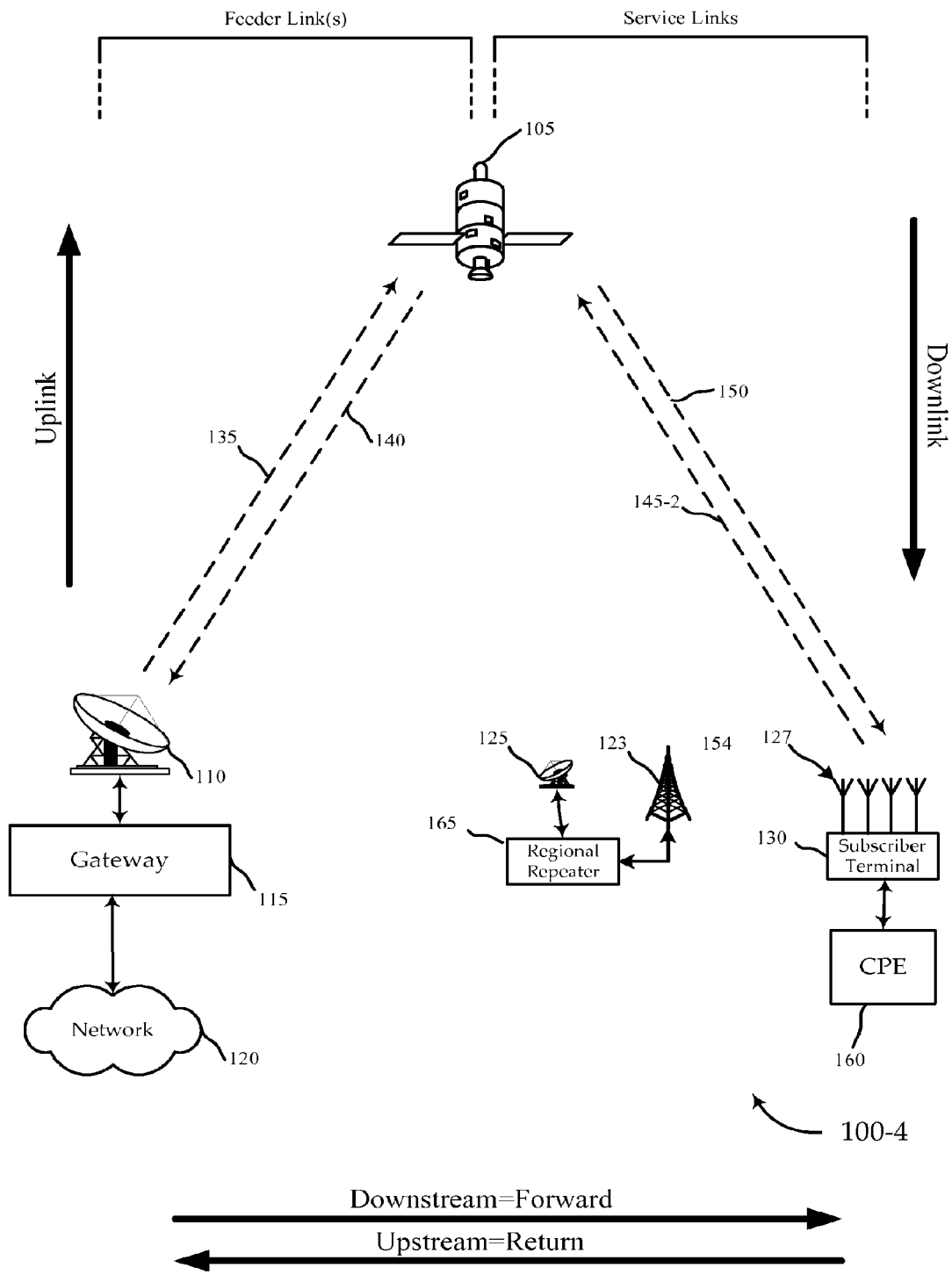
FIG. 3B depicts a subscriber terminal communicating with a gateway over a first satellite using SIMO techniques and the introduction of a terrestrial link according to one embodiment of the invention.
Figure 3C:
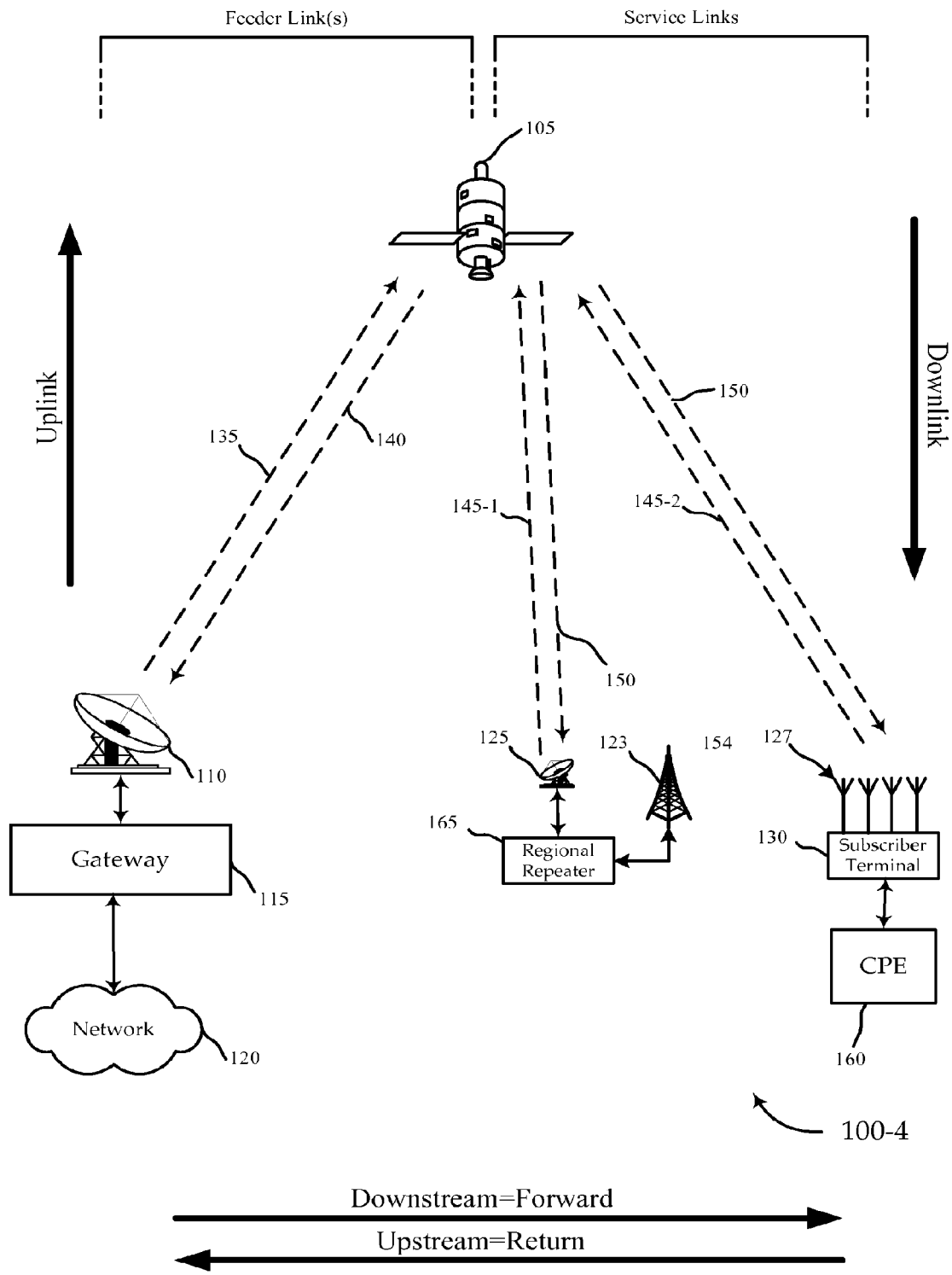
FIG. 3C depicts a subscriber terminal communicating with a gateway over a first satellite, using SIMO techniques and the establishment of a terrestrial link according to one embodiment of the invention.
Figure 3D:
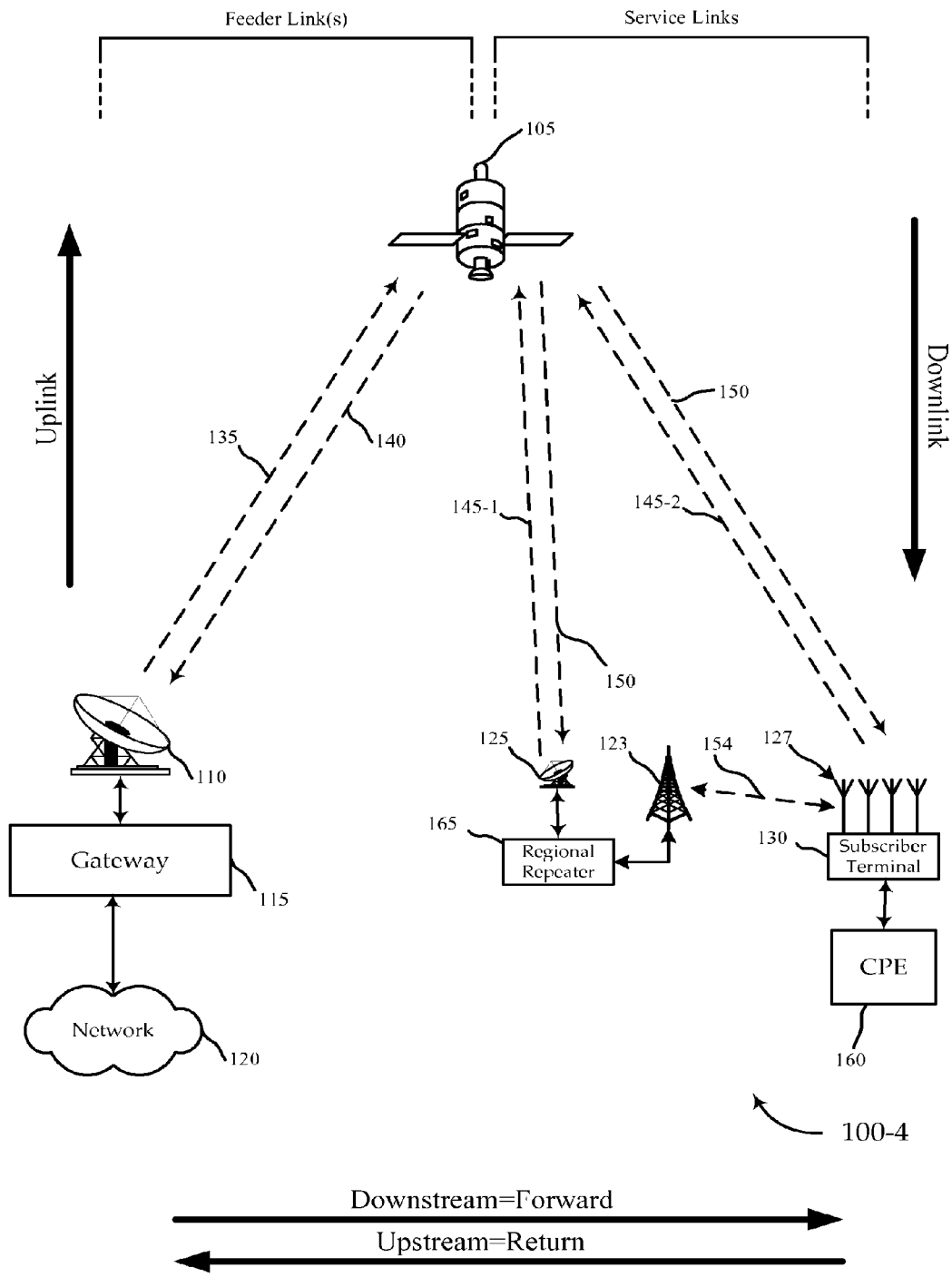
FIG. 3D depicts a subscriber terminal communicating with a gateway over a first satellite and a terrestrial link using MIMO techniques according to one embodiment of the invention.

FIGS. 3A, 3B, 3C and 3D show a system deploying a first satellite 105-1 and then switching to system with an additional terrestrial link 123 according to one embodiment of the invention. FIG. 3A depicts a subscriber terminal 130 with a plurality of antennas 127 communicating with a gateway 110 over a first satellite 105-1 using SIMO and/or SISO techniques. FIG. 3B shows the introduction of a terrestrial repeater. FIG. 3C shows the satellite and gateway establishing a communication link with the terrestrial repeater. FIG. 3D shows the subscriber terminal 130 communicating with the gateway 120 over the first satellite 105 and the terrestrial link 123 using MIMO techniques according to one embodiment of the invention.

Figure 4:
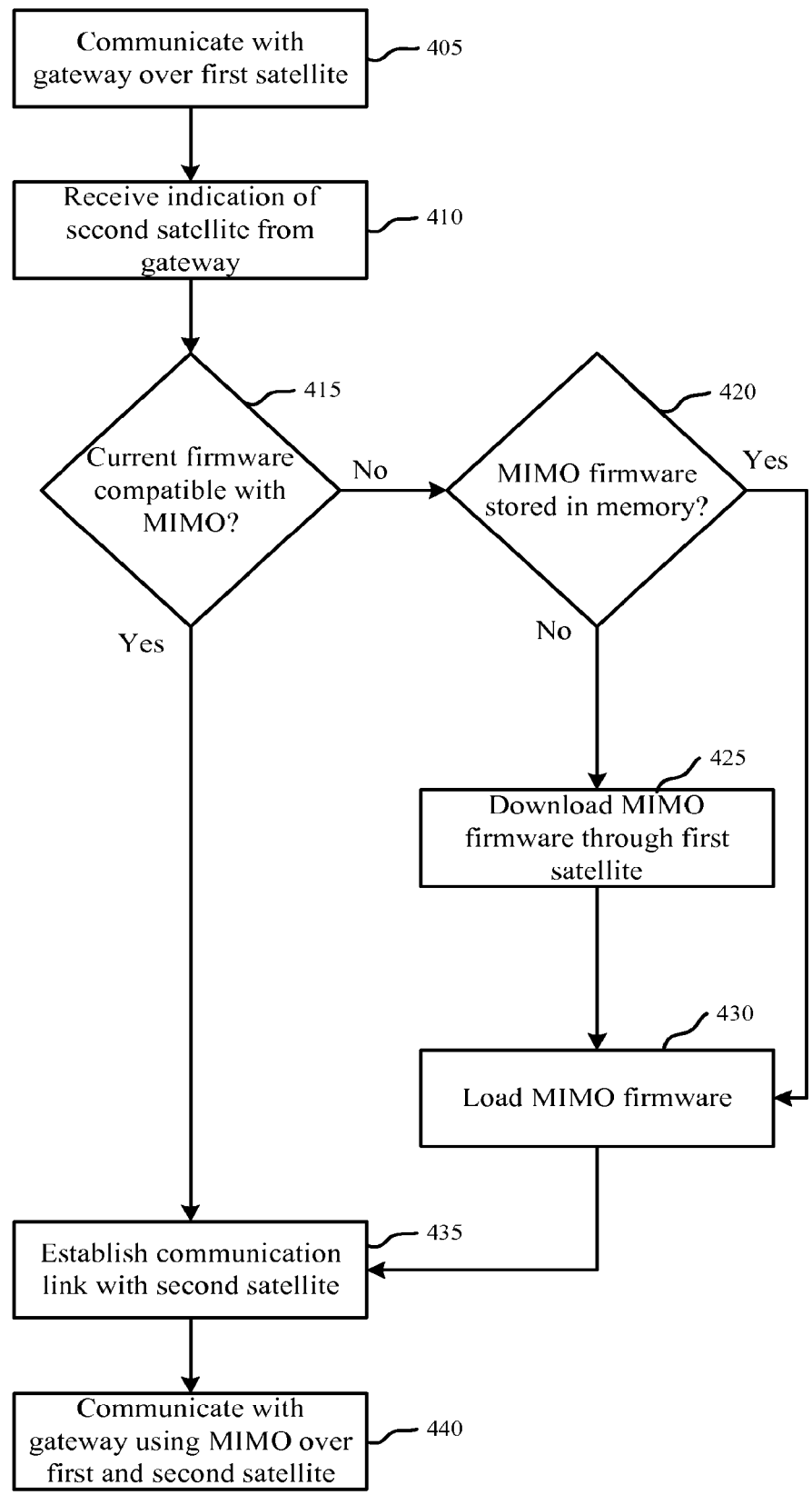
FIG. 4 shows a flowchart depicting a method for scaling a SIMO satellite communication link to a MIMO communication link according to one embodiment of the invention.

FIG. 4 shows a flowchart depicting a method for scaling a SIMO satellite communication link to a MIMO satellite communication link according to one embodiment of the invention. According to this embodiment of the invention, a subscriber terminal may communicate with a gateway over a first satellite at block 405. At some later point, the subscriber terminal may be informed that a second satellite is available at block 410. The gateway may inform the subscriber terminal of the presence of a second satellite through the first satellite. The subscriber terminal may then determine whether the current firmware is compatible with MIMO at block 415. For instance, the subscriber terminal may compare the firmware version loaded at the subscriber terminal with the most current version as communicated to the subscriber terminal from the gateway through the first satellite.

If the current firmware is not compatible, the subscriber terminal may then check to see if MIMO firmware is stored in memory at block 420. If the firmware is stored in memory, then the firmware is loaded within the subscriber terminal at block 430; otherwise MIMO firmware is downloaded from the gateway through the first satellite at block 425, which then proceeds to block 430. Once MIMO firmware is loaded, a communication link is established with the second satellite at block 435, whereupon MIMO communication between the subscriber terminal and the gateway is established at block 440.

Figure 5:
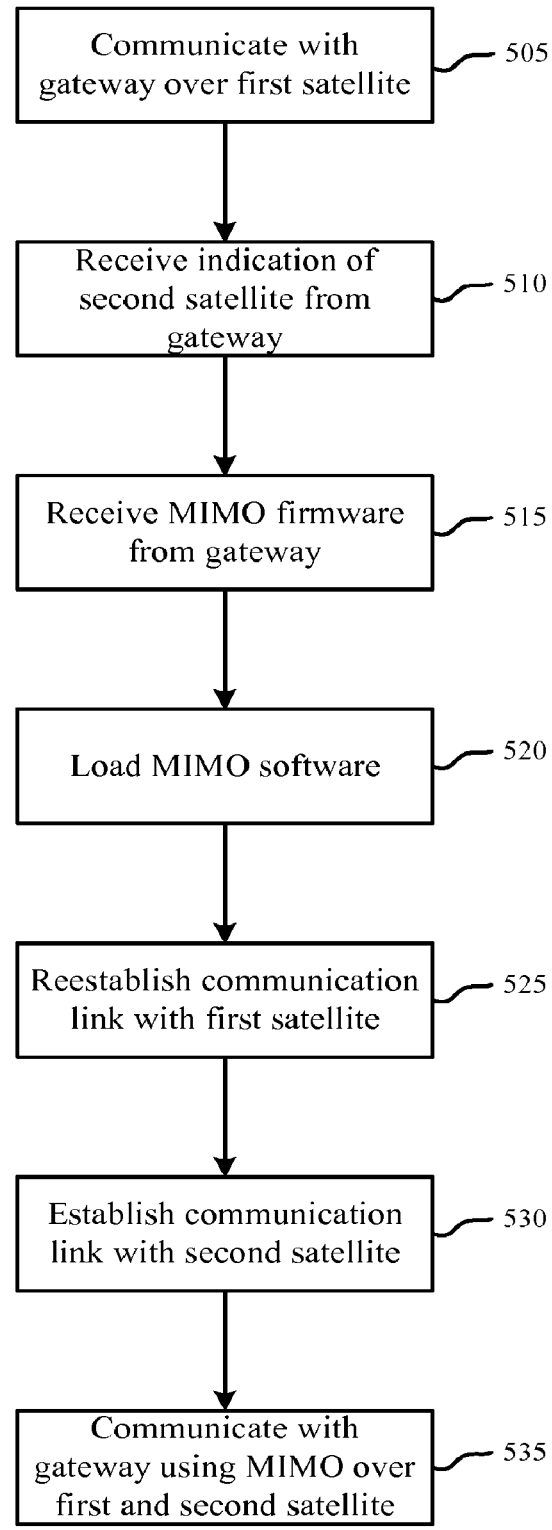
FIG. 5 shows another flowchart depicting a method for scaling a SIMO satellite communication link to a MIMO communication link according to one embodiment of the invention.

FIG. 5 shows another flowchart depicting a method for scaling a SIMO satellite communication link to a MIMO communication link according to one embodiment of the invention. According to this embodiment of the invention, a subscriber terminal may communicate with a gateway over a first satellite at block 505. An indication may then be received from the first satellite indicating the presence of a second satellite or subscriber terminal at block 510. MIMO firmware is then downloaded at block 515 and loaded at block 520. In some embodiments of the invention, a firmware upgrade for all the subscriber terminals in a system may occur globally. Communication is reestablished with first satellite at block 525 and a link is established at block 530. Finally, communication between gateway and subscriber terminal is established at block 535.

Figure 6:
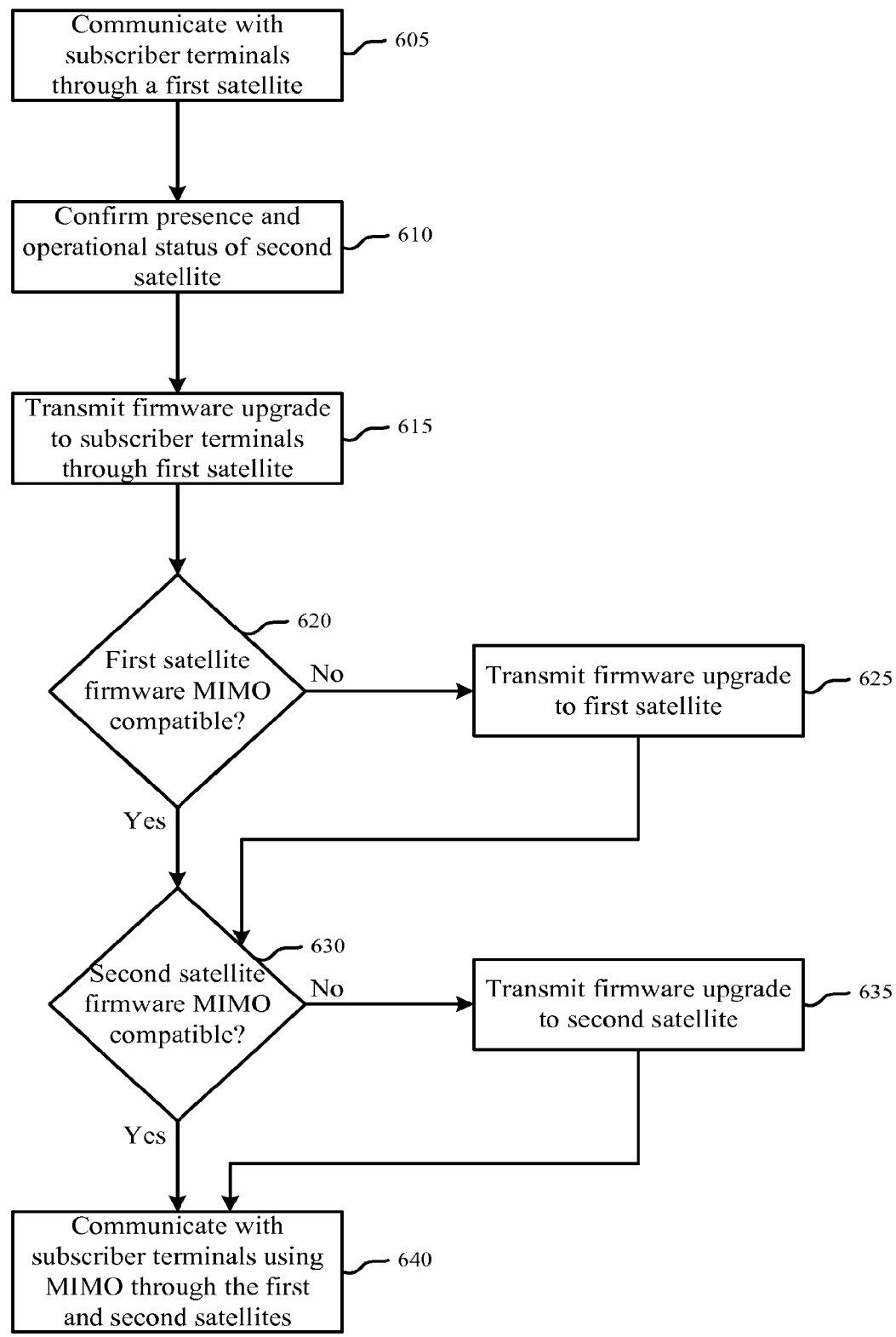
FIG. 6 shows another flowchart depicting a method for scaling a SIMO satellite communication link to a MIMO communication link according to one embodiment of the invention.

FIG. 6 shows another flowchart depicting a method for scaling a SIMO satellite communication link to a MIMO communication link according to one embodiment of the invention. A subscriber terminal communicates with the gateway over a first satellite at block 605. The operational status of a second satellite or terrestrial link is confirmed at block 610. The firmware on the subscriber terminals is upgraded at block 615. The firmware on the first satellite is checked for compatibility with MIMO at block 620 and an upgrade is provided at block 625 if needed. The firmware on the second satellite is checked for compatibility with MIMO at block 630 and an upgrade is provided at block 635 if needed. Once the firmware is upgraded on the subscriber terminals and/or the first and second satellites, a MIMO communication link may then be established at block 640.

Figure 7:
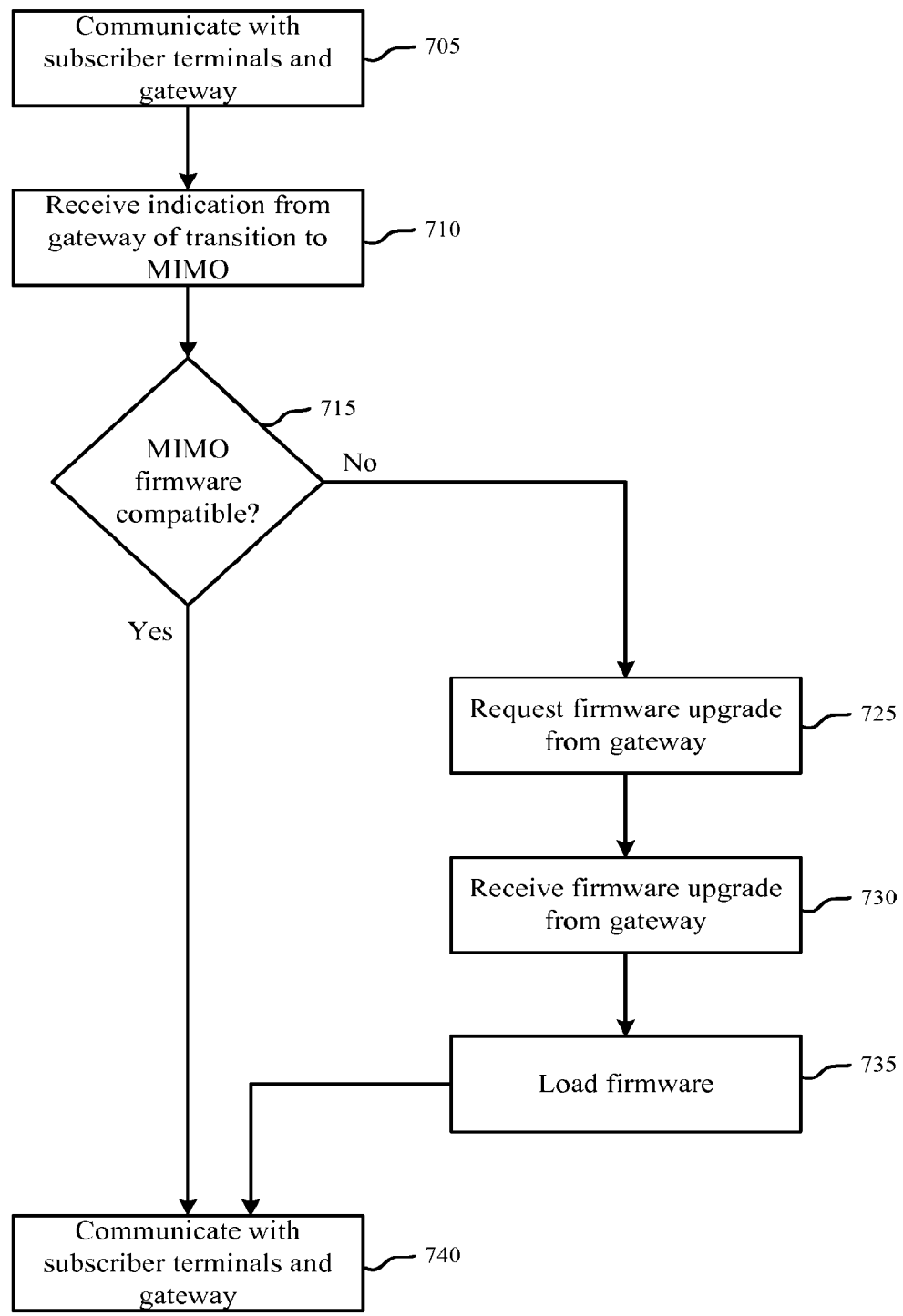
FIG. 7 shows another flowchart depicting a method for scaling a SIMO satellite communication link to a MIMO communication link at a first satellite according to one embodiment of the invention.

FIG. 7 shows another flowchart depicting a method for scaling a SIMO satellite communication link to a MIMO communication link at a first satellite according to one embodiment of the invention. Communication between the subscriber terminal and the gateway is established at block 705. At block 710 an indication is received at the first satellite from gateway that a switch to MIMO will occur at block 710. The firmware at the first satellite is analyzed for compatibility with MIMO at block 715. If the firmware is not compatible at the first satellite, the first satellite requests an upgrade, receives the upgrade and loads the upgrade at blocks 725, 730, 735. Once the firmware is in place, MIMO communication may occur over the first satellite at block 740.

Figure 8:
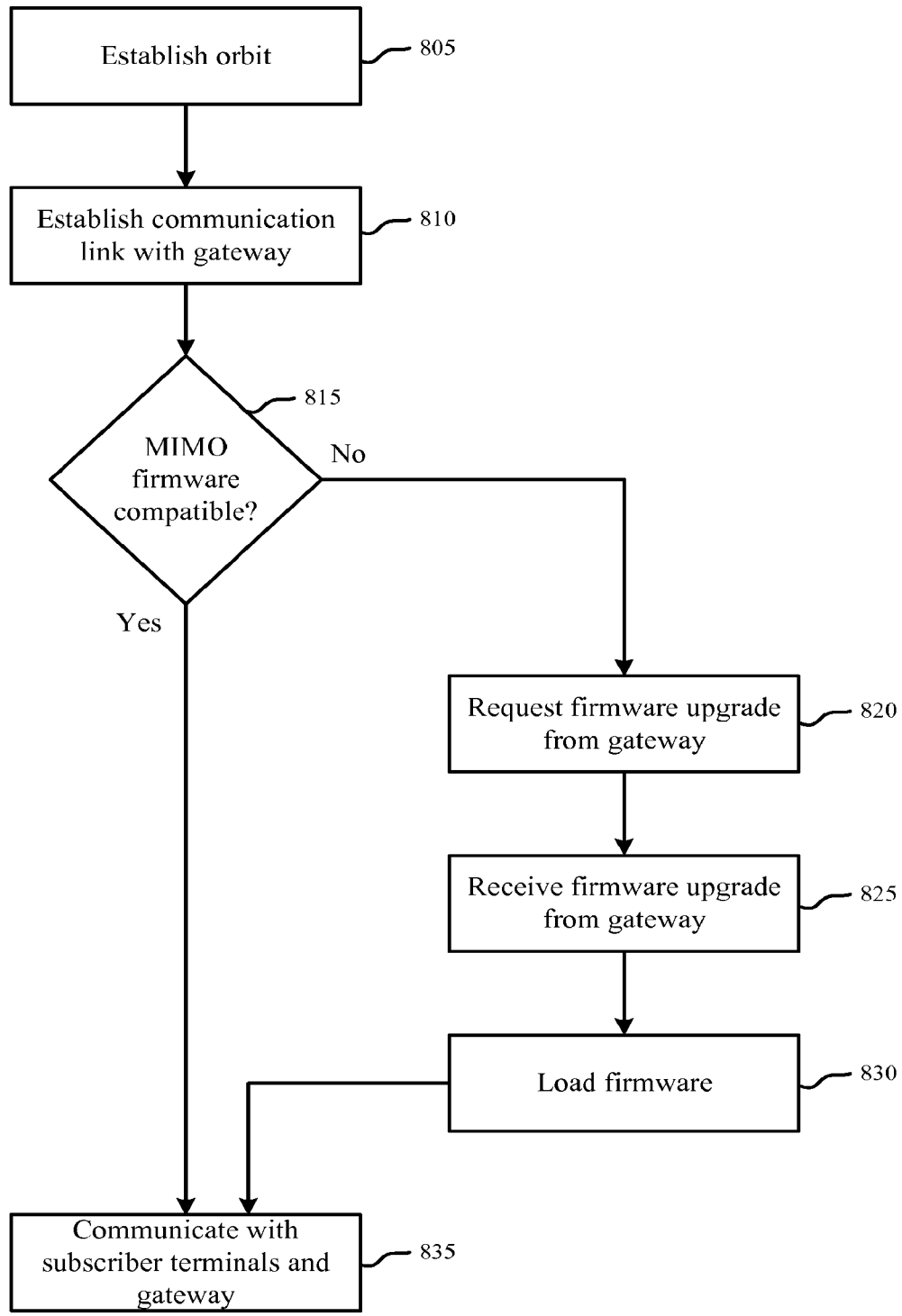
FIG. 8 shows another flowchart depicting a method for scaling a SIMO satellite communication link to a MIMO communication link at a second satellite according to one embodiment of the invention.

FIG. 8 shows another flowchart depicting a method for scaling a SIMO satellite communication link to a MIMO communication link at a second satellite according to one embodiment of the invention. The second satellite's orbit is established along with a communication link with the gateway at blocks 805, 810. The firmware on the satellite is checked for compatibility at block 815. If the firmware is not compatible at the second satellite, the second satellite requests an upgrade, receives the upgrade and loads the upgrade at blocks 825, 830, 835. Once the firmware is in place, MIMO communication may occur over the first satellite at block 840.

Figure 9:
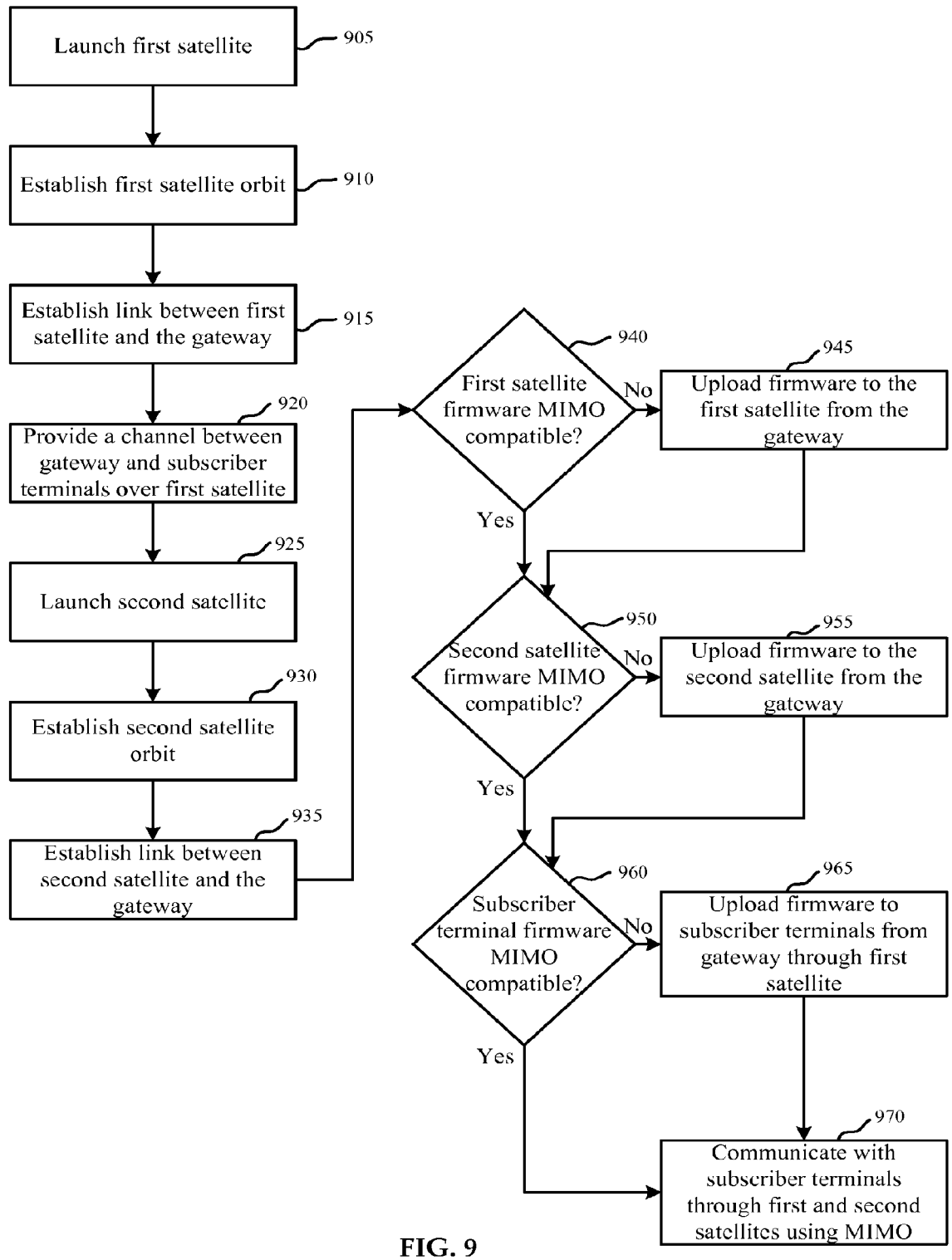
FIG. 9 shows another flowchart depicting a method for scaling a SIMO satellite communication link to a MIMO communication link according to one embodiment of the invention.

FIG. 9 shows another flowchart depicting a method for scaling a SIMO satellite communication link to a MIMO communication link according to one embodiment of the invention. A first satellite is launched and an orbit is established at blocks 905, 910. A link between the first satellite and the gateway may then be established at block 915. A channel utilizing the first satellite may then be established between the first satellite and the gateway at block 920. A second satellite is launched and an orbit is established at blocks 925, 930. A link between the second satellite and the gateway may then be established at block 935. Blocks 940, 945, 950, 955, 960, 865 determine whether MIMO firmware is available and, if it is not, such firmware is uploaded, whereupon communication is established between the subscriber terminal and the gateway over the first and second satellites at block 970.

Figure 20:
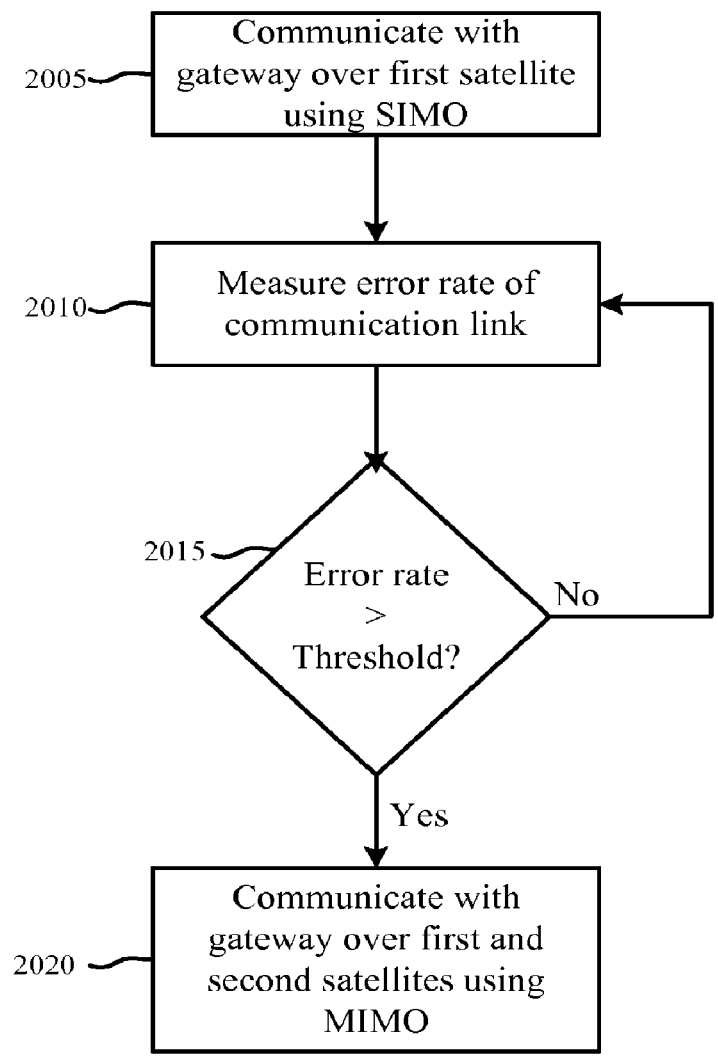
FIG. 20 shows a flowchart of a method for switching between SIMO and MIMO in response to an increase in the error rate according to one embodiment of the invention.

FIG. 20 shows a flowchart of a method for switching between SIMO and MIMO in response to an increase in the error rate according to one embodiment of the invention. Communication with the gateway is established over a first satellite using SIMO at block 2005. The error rate of the communication link is measured at block 2010. If the error rate of the channel increases above a threshold as determined at block 2015, then a MIMO link may be established at block 2020.

Figure 21:
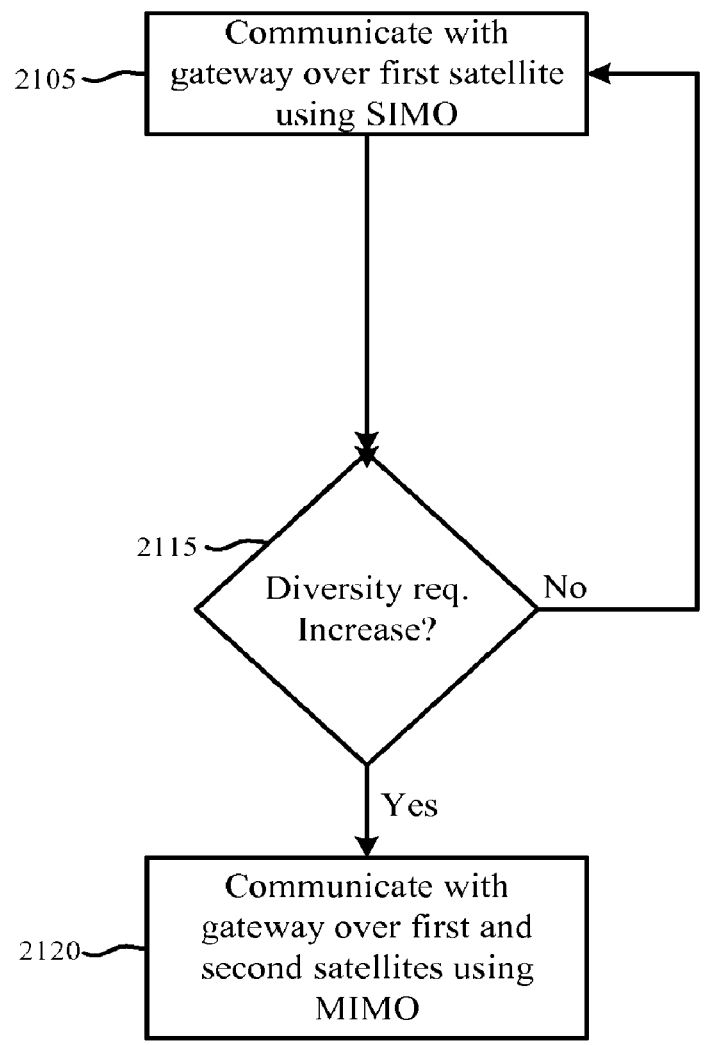
FIG. 21 shows a flowchart of a method for switching between SIMO and MIMO in response to an increase in diversity requirements according to one embodiment of the invention.

FIG. 21 shows a flowchart of a method for switching between SIMO and MIMO in response to an increase in diversity requirements according to one embodiment of the invention. Communication with the gateway is established over a first satellite using SIMO at block 2105. The system may then determine the diversity requirements of the system at block 2115. If the diversity requirements of the channel has increased at block 2115 then a MIMO link may be established at block 2120.

Figure 22:
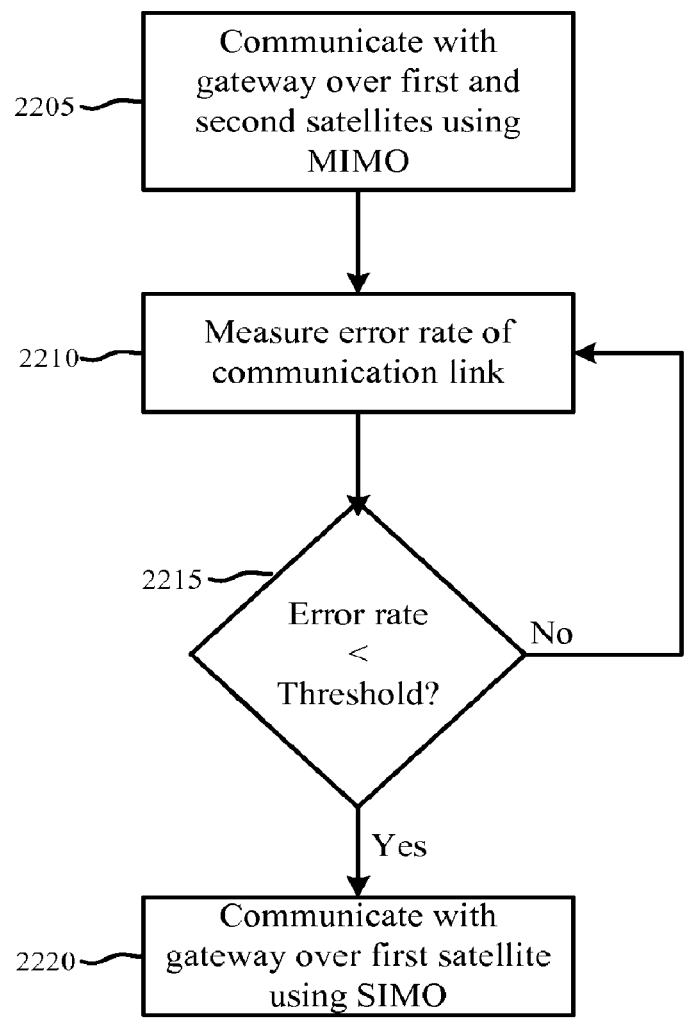
FIG. 22 shows a flowchart of a method for switching between MIMO and SIMO in response to a decrease in the error rate according to one embodiment of the invention.

FIG. 22 shows a flowchart of a method for switching between MIMO and SIMO in response to a decrease in the error rate according to one embodiment of the invention. Communication with the gateway is established over a first and second satellite using MIMO at block 2005. The error rate of the communication link is measured at block 2010. If the error rate of the channel decreases below a threshold as determined at block 2015, then a SIMO link may be established at block 2020.

Section II

Figure 10:
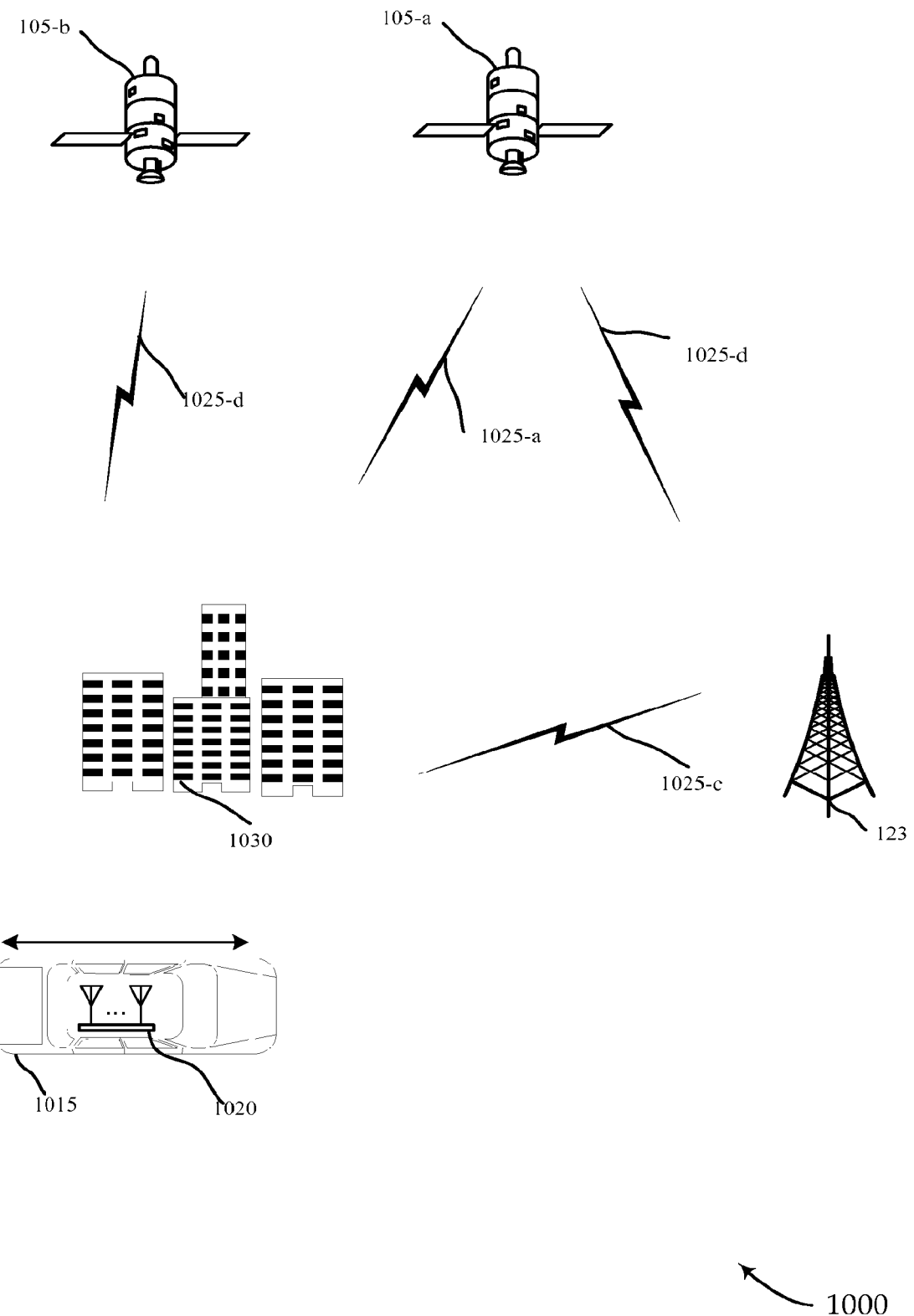
FIG. 10 depicts block diagrams of embodiments of a satellite system.

Systems, methods, devices, and software are described for transmission and reception of satellite signals in a satellite (or hybrid satellite/terrestrial) communications system according to another embodiment of the invention. Referring to FIG. 10, a block diagram illustrating a satellite communications system 1000 with various links 1025, wherein the embodiments described herein may be implemented. The system 1000 depicted includes one, or more, satellites 105, in communication via wireless signals 1025 with a subscriber terminal 1020. A variety of physical layer transmission modulation and coding techniques may be used by the satellite 105 in accordance with certain embodiments of the invention, including those defined with the DVB-S2, DVB SH, and WiMAX standards.

In one embodiment, a first satellite 105-a and second satellite 105-b each transmit a separate signal (1125-a and 1125-d, respectively), which may be transmitted on a shared frequency. Each signal is received by two, or more, antennas at the subscriber terminal. In another embodiment, a satellite 105-a and base station (e.g., a repeater, or independent content provider) communicate with the subscriber terminal via separate wireless signals (1025-a and 1025-c, respectively) in a coordinated manner. Each signal may be transmitted on a shared frequency, and is received by two, or more, antennas at the subscriber terminal 1020. In yet another embodiment, a single satellite 105-a may transmit one or more such signals 1025-a (e.g., separate signals from two, or more, diverse antennas). The above are examples only, however, as in other embodiments, as there may be any combination of N transmit antennas and M receive antennas, where N and M are each greater than or equal to two. Also, although the description above relates to the downstream signals, the description applies to upstream transmissions, as well (e.g., from the subscriber terminal 1020 to satellite(s) 105, or satellite 105 and terrestrial 123, antennas).

In the illustrated embodiment, the subscriber terminal 1020 is attached to the roof of, or otherwise integrated with, an automobile 1015. In other embodiments, the subscriber terminal 1020 may be any wireless receiver attached or otherwise integrated with another moving vehicle (e.g., a bus, train, airplane, truck, etc.). In still other embodiments, the subscriber terminal 1020 may be a stand-alone wireless device that is otherwise mobile. In one embodiment, the subscriber terminal 1020 is in motion, and natural or man-made obstacles 1030 give rise to multipath signals.

Figure 11:
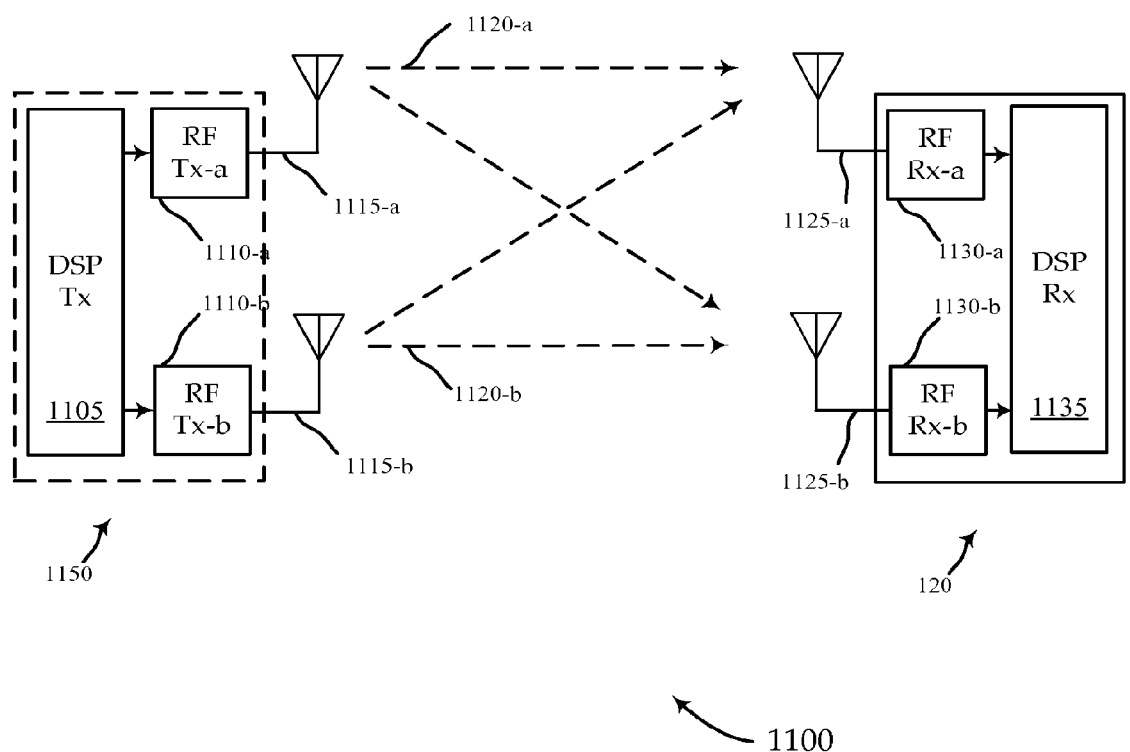
FIG. 11 depicts a block diagram of an embodiment of a system for transmitting information using MIMO according to another embodiment of the invention.

Turning to FIG. 11, a system 1100 is shown which illustrates a variety of alternative communication schemes that may be leveraged in the system 100 set forth related to FIG. 10. The system 1100 includes a set of transmitters 1150 and a receiver 1020 (e.g., a subscriber terminal of FIG. 10). The system 1100 includes two diverse (e.g., spatial or polarization diversity) antennas (1115-a and 1115-b) for the transmitters. In one embodiment, one transmit antenna 1115-a is on a satellite 105-a and the other antenna 1115-b is at a base station 123. In one embodiment, one antenna 1115-a is on a first satellite 105-a and the other antenna 1115-b is at second satellite 105-b. The antennas 1115 may, in other embodiments, be on the same satellite.

Each antenna (1115, 1125) may be made up of one or more individual antenna elements. Each antenna may be a fixed or phased array of, for example, monopoles or other radiating elements, or any other type or configuration known in the art. A variety of types of beam forming may be used by adaptively controlling the processing of the array to improve performance, as discussed below or known in the art.

In one embodiment, each transmit chain at the transmitter 1150 processes a plurality of data streams (which may, but need not, be independent) at the DSP 1105. A D/A conversion, upconversion, and amplification are performed on each stream using RF transmit components 1110 to create the separate signals (1120-a and 1120-b). Each signal 1120 is transmitted at the same time using each respective antenna (1115-a and 1115-b). At the subscriber terminal 1020, antennas (1125-a and 1125-b) each receive a copy of each signal (1120-a and 1120-b). The antennas are diverse in one embodiment (e.g., spatial, angular, or polarization diversity). RF receive components 1130 amplify, downconvert, and perform A/D conversions, and DSP 1135 process each digitized signal combination to recover the data streams.

In one embodiment, various techniques are used (e.g., by the systems 1000, 1100 of FIG. 10 or 11) to process data streams. In one embodiment, diversity techniques (e.g., selection combining, equal gain combining, maximal ration combining (MRC), certain space-time codes, or hybrid methods) are used. In another embodiment, spatial multiplexing techniques may be used to process independent data streams. In other embodiments, spatial multiplexing techniques may be used in combination with diversity techniques and/or space-time codes. A variety of techniques may be used, including various space-time block codes, space-time trellis codes, super-orthogonal space time trellis codes, differential space-time modulation, decision feedback equalization combined with zero forcing or minimum mean square error (MMSE) (e.g., Bell Labs Layered Space-Time (BLAST) architectures), and combination techniques.

The above descriptions related to FIG. 11 are examples only. In other embodiments, there may be any combination of N transmit antennas and M receive antennas, where N and M are each greater than or equal to two. Also, although the description above relates to the downstream signals, the description applies to upstream, transmissions, as well (e.g., from the subscriber terminal 1020 to satellite(s) 105, or satellite 105 and terrestrial 110, antennas).

Figure 12A:
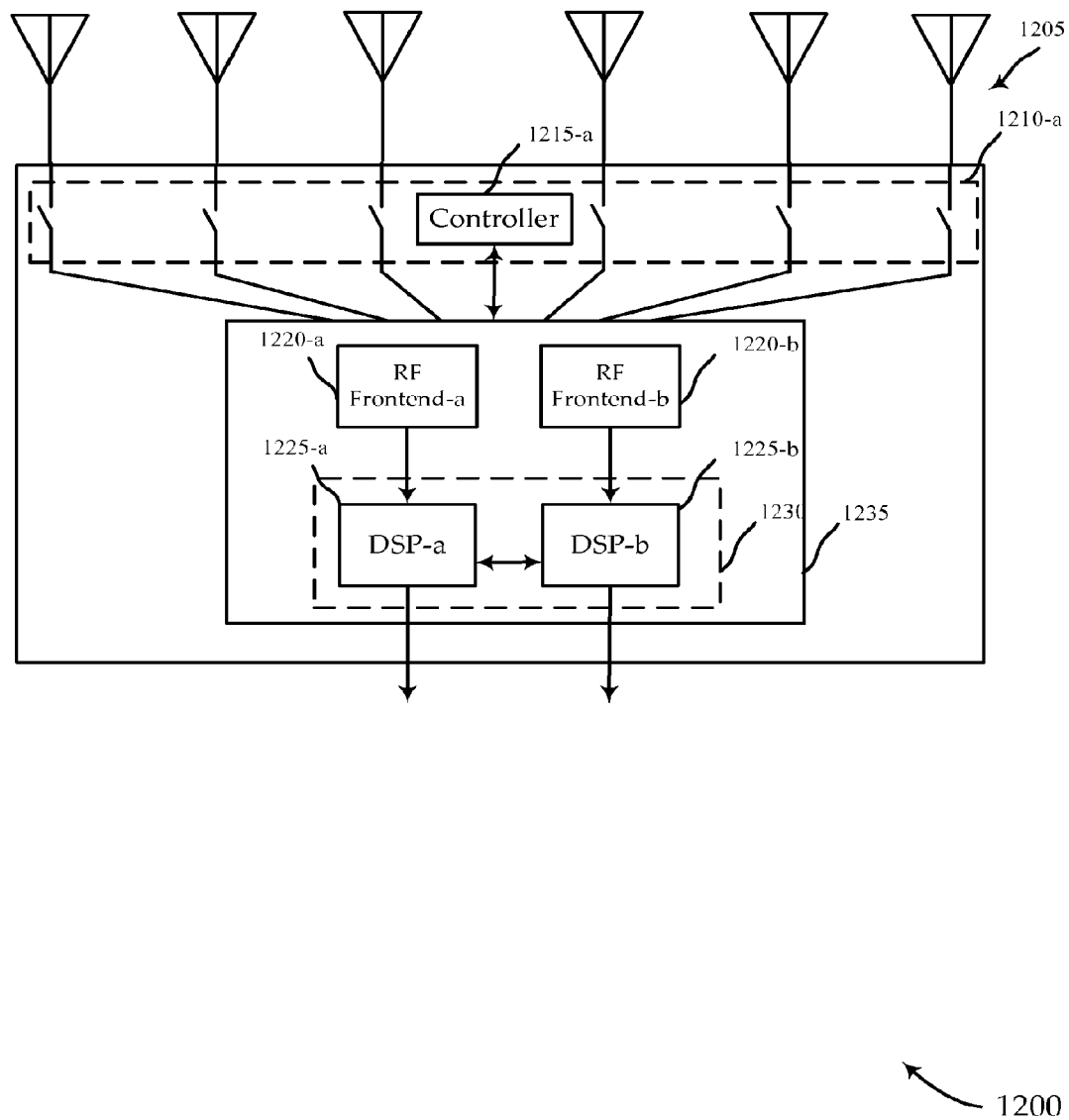
FIGS. 12A and 12B show embodiments of a MIMO subscriber terminal according to another embodiment of the invention.

Referring to FIG. 12A, a device 1200 is shown which may be used to receive the signals 1120 of FIG. 11. The device 1200 may, therefore, be the receiver 1020 of FIG. 10. In one embodiment, the device includes a number of antennas (or antenna elements) 1205. In FIG. 12A, there are six antennas 1205, but it is worth noting that this is for purposes of example only (i.e., there may be three or more antennas (or antenna elements) in other embodiments).

The set of antennas is, in one embodiment, made up of a number of different types or configurations of antennas, some of which are more efficient for different signals or conditions. One or more of the antennas may be antenna arrays. For example, certain antennas may be configured to receive line-of-site satellite signals, while others may be configured to receive and process multipath signals. The spacing of the antennas may vary depending on the application. The antennas could be of different shapes to accommodate satellite and terrestrial links. In some embodiments, therefore, the composition, size, spacing, and components of an antenna may be different for the antennas of a given device.

In one embodiment, the device 1200 also includes a set of switches 1210-a, one or more for each antenna 1205. The switches are configured to couple the signals from the antennas 1205 to a select one of a set of receive chains 1235. The device 1200 in this embodiment includes only two receive chains (i.e., (1) 1220-a and 1225-a, and (2) 1220-b and 1225-b). Note that, in other embodiments, the number of receive chains may be any subset of the receive antennas 1205 (e.g., 4 of 8, or n of M).

Thus, the switches 1210 may be used to dynamically switch the input of a given receive chain between different receive antennas 1205. The device 1200 also includes a controller 1215-a which is configured to control the operation of the switches. The controller 1215-*a* may receive information from the set of receive chains 1235. The controller 1215-*a* may be preprogrammed to switch randomly or systematically when the channel (actual or estimated) falls below a particular threshold. The controller 1215-*a* may also use previously received channel information from the set of receive chains to select the antenna 1205. The controller 1215-*a* may also perform channel monitoring, perhaps directing an inactive receive chain to round robin through the antennas 1205 and provide information. The thresholds for switching could be dynamically set depending on the environment.

Each RF frontend 1220 (including, e.g., a LNA, mixer for downconversion, A/D converter, etc.) may receive and digitize a signal from the selected antenna 1205. The digitized signal is then processed by a DSP 1225, producing the data stream (note that although the DSPs 1225 are depicted separately, a single processor 1230 may perform operations for each chain). Particular receive chains of the set 1235 may also be configured to perform beam-forming on the select antenna 1205. The data stream may then be processed further and, possibly, forwarded by the other components (not shown) of the device 1200.

Although the dynamic switching shown is related to a receiver, one skilled in the art will recognize that such a scheme could be applied to a transmitter, as well. In such an embodiment, received signals could aid the controller in estimating the available channels for purposes of switching the transmit antennas. Also, the signal recipients (e.g., the base station 123) could feed back channel information directed at the controller which could provide actual channel information. Note, also, that each receive chain need not be used in each instance (e.g., a subset of the receive chains may be used in certain instances when the signal is particularly strong (e.g., if the SNR or other channel measurement is above a certain threshold).

Figure 12B:
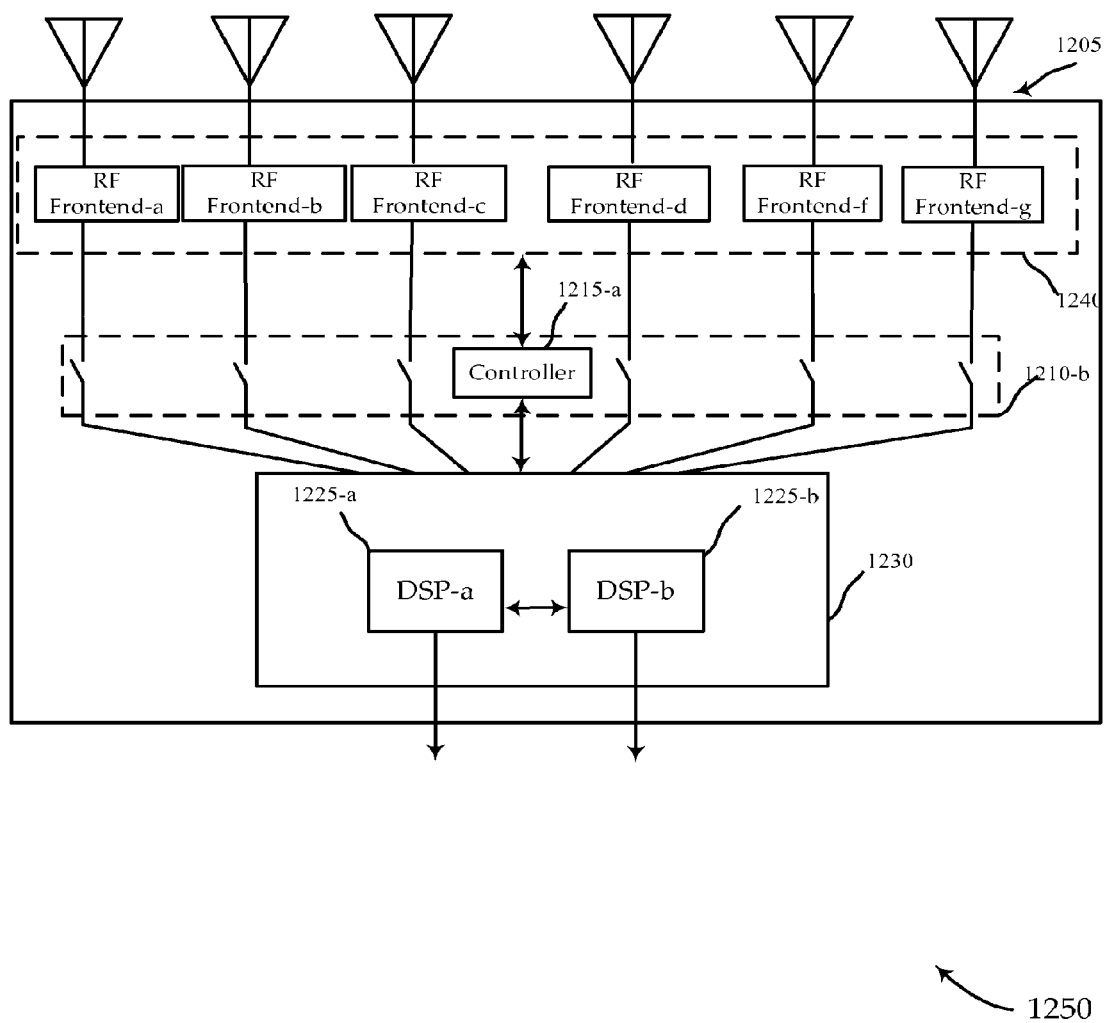

In another embodiment, FIG. 12B shows an alternative device 1250 which may be used to receive the signals 1120 of FIG. 11. The device 1250 may, therefore, be the receiver 1020 of FIG. 10. Again, the device 1250 includes a number of antennas (or antenna elements) 1205. One or more of the antennas 1205 may be antenna arrays. In this embodiment, there are again six antennas 1205. The device 1250 also includes a set of RF frontends 1240 (e.g., a LNA, mixer for downconversion, and A/D converter), one for each antenna (or for a subset of antennas). The device also includes a set of switches 1210-*b*, one or more for each antenna and associated RF frontend 1240. The switches are configured to couple the signals from each RF frontend 1240 to a select one of a set of receive chains 1230. The device 1200 in this embodiment includes DSPs 1225 to process only 2 of the digitized signals. Note that, in other embodiments, the digital signal processing capabilities may be any subset of the receive antennas 1205 (e.g., 4 of 8, or n of M).

Thus, the switches 1210 are used to dynamically switch the input of a given DSP between different receive antennas 1205. The device may also include a controller 1215-*b* which is configured to control the operation of the switches, and operating in a similar fashion to that described with reference to the device 1200 of FIG. 12A. However, because of the RF frontend 1240 processing for each antenna, more detailed information about each channel may be sent to the controller 1215. With this additional information, switching thresholds may be based on differences in channel. Although the RF frontend 1240 of this embodiment may include a LNA, mixer for downconversion, and A/D converter, in other embodiments the RF components for each antenna may be pared down so that the controller may have different levels of channel knowledge (e.g., include only an LNA and downconverter).

Section III

A subscriber terminal configured to receive and transmit satellite communication signals includes two or more antennas which are intentionally configured to receive multipath signals according to another embodiment of the invention. In one embodiment, the antennas may include a radiation pattern below the line-of site elevation of a communications satellite directed to emphasize the gain of multipath signals from satellites, or a satellite and a base station. In other embodiments, the subscriber terminal may include and switch between different types of antennas, with the radiation pattern for certain antennas configured for a line-of site connection, and the radiation pattern for others configured for multipath signals. Digital or analog beamforming antennas may also be used to selectively emphasize multipath signals.

A multiple input multiple output subscriber terminal is configured with two or more antennas which are intentionally configured with a radiation pattern below the line-of site elevation of a communications satellite. The antennas may be individual fixed antennas elements or fixed antenna arrays. The subscriber terminal may include different types of antennas, and may switch from a line of site antenna to the lower elevation radiation pattern antenna. Digital or analog beamforming antennas may also be used.

Figure 13A:
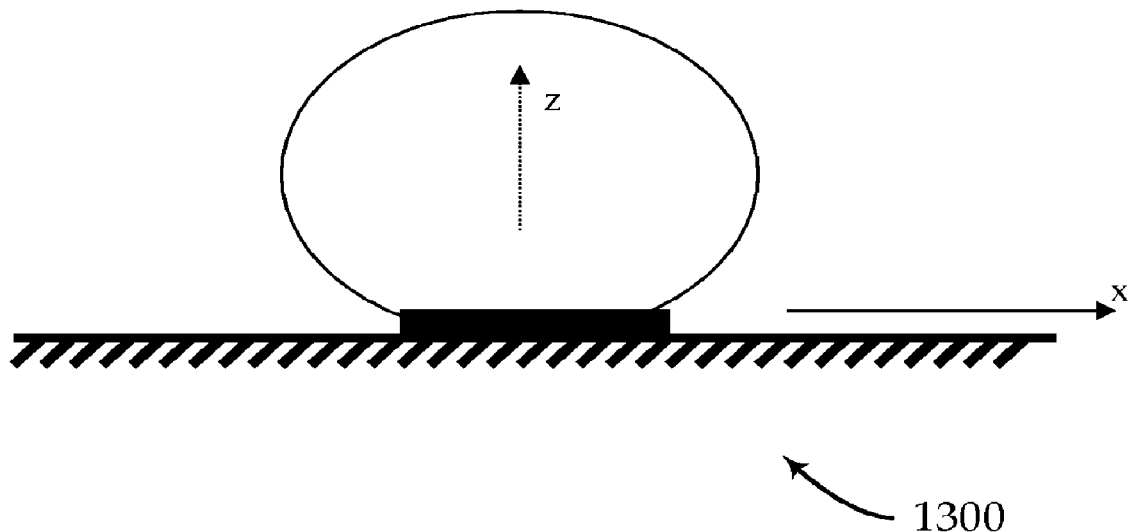
FIG. 13A shows an exemplary cardioid antenna according to another embodiment of the invention.
Figure 13B:
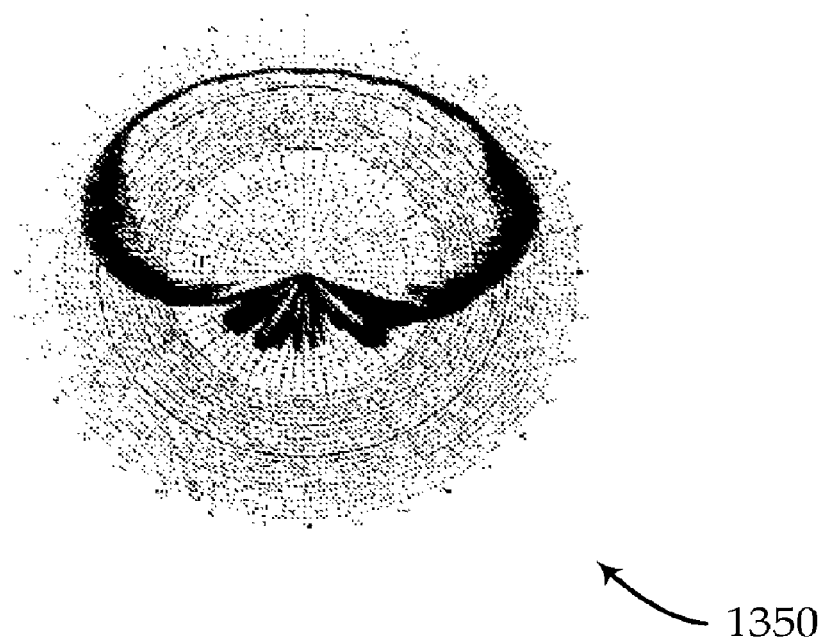
FIG. 13B shows the upward radiation pattern that may result using the cardioid antenna shown in FIG. 13A.
Figure 14A:
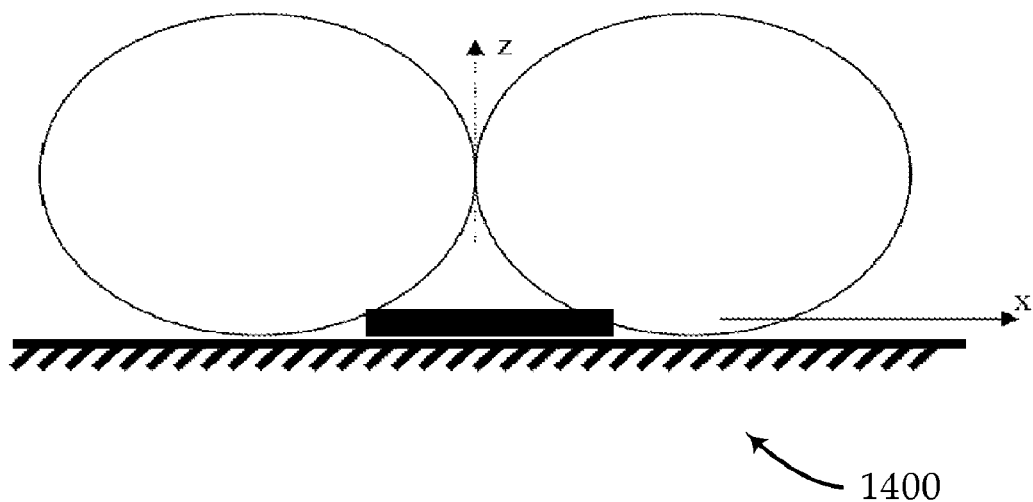
FIG. 14A shows an exemplary monopole antenna according to another embodiment of the invention.
Figure 14B:
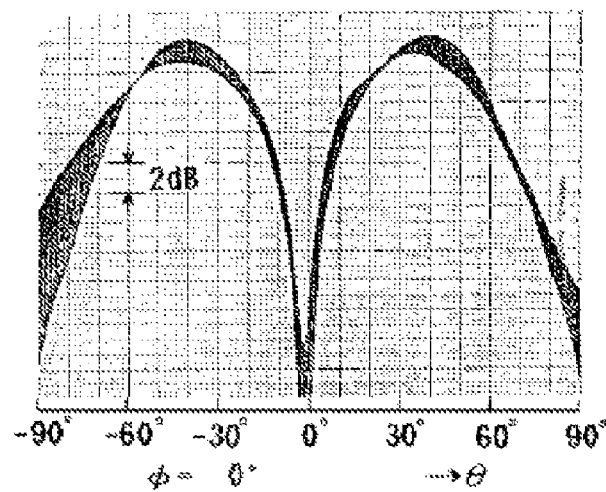
FIG. 14B shows the two-lobed upward radiation pattern that may result using the monopole antenna shown in FIG. 14A.

One or more of the antennas 1125 may be a cardioid antenna 1300, as illustrated in FIG. 13A. It may be configured to produce a heart-shaped upward radiation pattern 1350 illustrated in FIG. 13B, with a wider omnidirectional (in the x, y directions) radiation pattern than an unidirectional antenna. Alternatively, an antenna 1125 may be a monopole antenna 1400, as illustrated in FIG. 14A. It may be configured to produce a two lobe upward radiation pattern 1450 illustrated in FIG. 14B, with a null overhead and thus each lobe directed at an altitude of less than 90°.

In another embodiment, one or more of the antennas 1125 may be an antenna array (e.g., a linear, 2-dimensional, or 3 dimensional array). The elements of the array may be cardioid antennas 700, monopoles 800, or other radiating elements. The elements of the array may, for example, be fed from identical signals (same phase and amplitude) from a transmit chain. Alternatively, by varying the phase and/or amplitude of selected elements, the radiating pattern of the array may be steered and modified. With beamforming, both the phase and amplitude of each (or at least a subset of) the elements of an array are controlled, and it is worth noting there may be analog or digital beamforming.

Figure 15A:
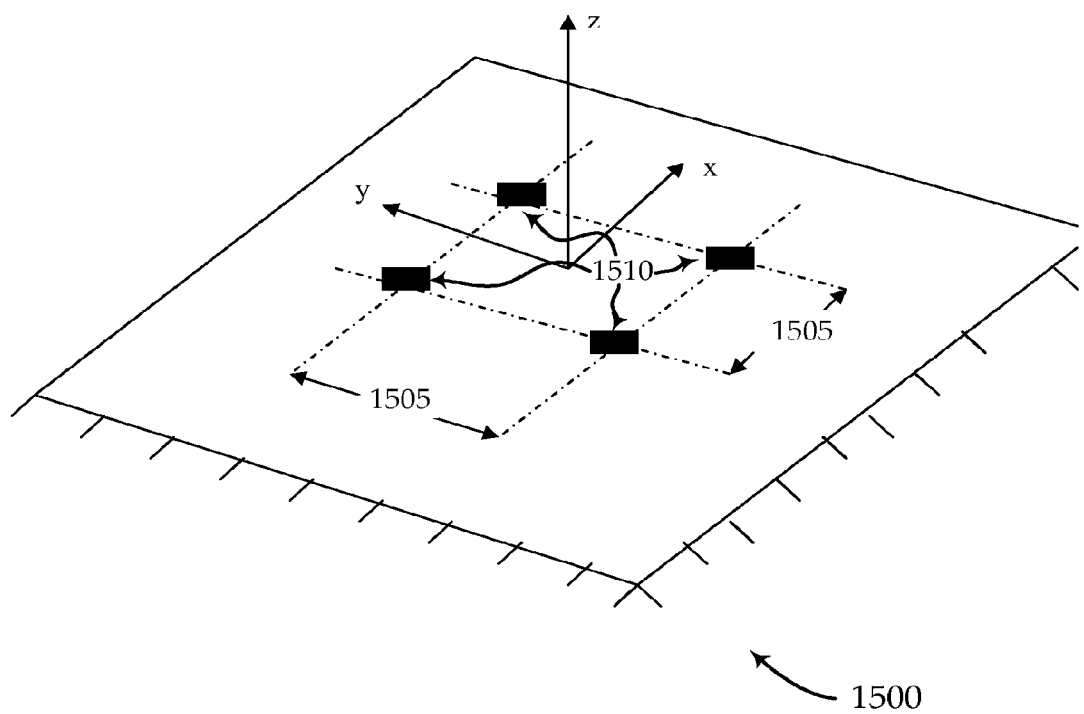
FIG. 15A shows an example of a 4-element antenna array according to another embodiment of the invention.
Figure 15B:
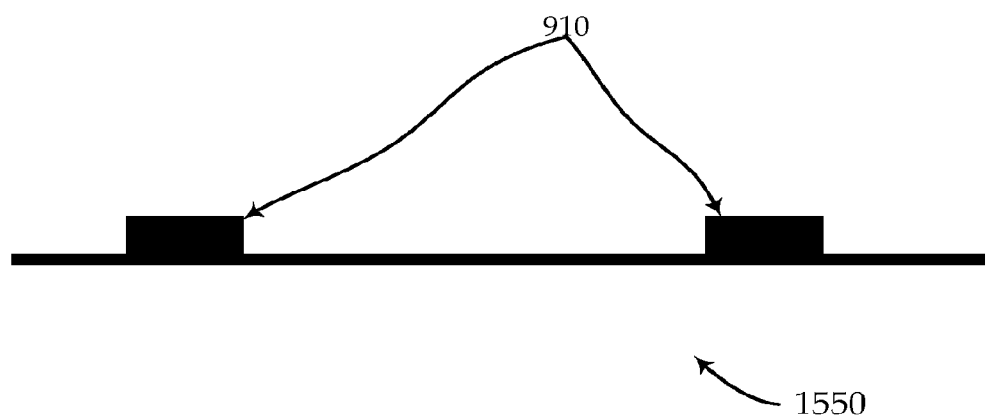
FIG. 15B shows a side view of the array shown in FIG. 15A.

Turning to FIG. 15A, an example of a 4 element array 1500 is shown, and the elements in this array may be cardioid antennas 700, monopoles 800, or other radiating elements. The spacing 1505 between the elements will impact the radiating pattern of the array. FIG. 15B is a side view of the array, and it is worth noting that the dimensions and other physical characteristics of the elements 1510 may also impact the radiating pattern and beamforming capabilities. A subscriber terminal 1020 may include a number of different types of arrays, or array and other antenna combinations. The configuration of the array elements may, therefore, be used to control the directional gain an antenna to accomplish the purposes set forth below. Also, certain subsets of these configuration types and parameters are discussed below.

Returning to FIGS. 10 and 11, again note that a subscriber terminal 1020 (and its two or more antennas 1115) may be configured to receive signals 1025 from one or more satellites 105, or receive signals from both a satellite 105 and base station 123. Consider that, for a given satellite or satellites, there are commonly used metrics (e.g., signal strength, SNR, BER, etc.) to determine an optimized elevation for emphasizing gain to receive (or transmit) line-of-site signals from transmitting satellite(s) 105. In one embodiment, the optimized directional elevation for a radiation pattern is the elevation (in degrees) of the satellite in the sky (e.g., from a particular place, or region, in the U.S. or Europe). In other embodiments, other metrics may be used.

In one set of embodiments, the radiation pattern for an antenna 1125 receiving and processing line-of-sight signals is intentionally configured to be directed lower on the horizon than a radiation pattern optimized to receive line-of-site signals from transmitting satellite(s) 105. In various embodiments, the directional elevation may be intentionally set to be equal to or greater than (1°, 2°, 5°, 10°, 15°, 20°, or 25°) below the optimized elevation. Alternatively, the radiation pattern may be configured in a direction equal to or greater than (1%, 2%, 5%, 10%, 15%, 20%, or 25%) below the optimized elevation. Thus, there may be various levels of gain bias that may be redirected lower on the horizon. The antennas configured according to this embodiment may be transmit and/or receive antennas.

In a corresponding set of embodiments, the radiation pattern gain for the altitude between (0°-10°, 0°-15°, 0°-20°, or 0°-25°) is intentionally increased relative to the pattern optimized for line-of-site transmission or reception. In yet another set of embodiments, the radiation pattern is divided between an emphasized satellite multipath gain and an emphasized base station multipath gain.

In one set of embodiments, the configuration of an antenna and radiation pattern are fixed. However, note that there may be more than one type or configuration of antennas for each subscriber terminal 1020. Thus, one antenna 1125 could be optimized for line-of-sight reception, and a second antenna 1125 could be intentionally configured with a radiation pattern below the optimized elevation. The mobile subscriber terminal may be configured to adapt to an urban area, for example, by switching between the antennas.

In another set of embodiments, a beamforming antenna 1125 to transmit and receive signals from a satellite 105 has a configurable radiation pattern that may be directed below the optimized elevation. The beamforming antenna may be configurable to have one or more radiation patterns directed toward line-of-sight reception with one or more satellites 105 and/or base stations. The beamforming antenna may also be configured to adapt its radiation pattern to intentionally focus upon an elevation below the respective line-of-sight elevations.

For beamforming antennas, or a subscriber terminal with dynamic switching, there are a variety of channel monitoring or scanning processes that may monitor active or inactive channels to determine the appropriate beamforming or switching. The timing and thresholds for such changes may occur adaptively, and depend upon conditions (e.g., location, velocity, type or quality of service, etc.).

In one set of embodiments, the radiation pattern for an antenna 1125 receiving and processing line-of-sight signals is intentionally configured to receive multipath signals from a transmitting satellite(s) 105, or a satellite 105 and base station 123. In various embodiments, the elevation may be intentionally set to be below the optimized line of site elevation, and instead intentionally directed at multipath signals. This design innovation may be implemented by using multipath data from research or other propagation information known in the art. The antennas configured according to this embodiment may be transmit and/or receive antennas.

In one set of embodiments, the configuration and radiation pattern of an antenna is fixed, and is designed specifically to receive multipath signals at the tradeoff of lesser gain at the line-of-site elevation. However, note that there may be more than one type or configuration of antennas for each subscriber terminal 1020. Thus, one or more antenna 1125 could be optimized for line-of-sight reception, and other antennas 1125 could be intentionally configured with a radiation pattern directed at multipath signals. There may be different configurations for terrestrial or satellite multipath signals, serving the same subscriber terminal 1020. The subscriber terminal may be configured to switch between the antennas. Various RF components with the subscriber terminal 1020, or elsewhere, could measure the multipath signals to determine the appropriate time to switch.

In another set of embodiments, a beamforming antenna 1125 which transmits and receives signals to and from a satellite 105 has a configurable radiation pattern that may be directed to receive multipath signals. The beam-forming antenna may be configurable to have one or more radiation patterns directed toward line-of-sight reception with one or more satellites 105 and/or base stations 123. The beamforming antenna may also be configurable to have one or more of the radiation patterns intentionally directed at an optimized elevation for multipath reception or transmission for the satellite or terrestrial link. Various RF components with the subscriber terminal 1020, or elsewhere, could measure the multipath signals to adapt the radiation pattern.

Section IV

A subscriber terminal is configured with multiple types of antennas. The spacing of the antennas may vary depending on the application according to another embodiment of the invention. The antennas could be of different shapes to accommodate satellite and terrestrial links. In some embodiments, therefore, the composition, size, spacing, and components of an antenna may be different for the antennas of a given device. In one embodiment, the antennas are coordinated to select a subset of the antennas for reception a given set of signals.

Section V

A system and method are described for dynamically switching between subscriber terminals serving a pool of users according to another embodiment of the invention. Each subscriber terminal includes two or more antennas for the transmission and reception of wireless signals to and from a satellite (and, in one embodiment, a base station). Subscriber terminals share channel information to identify one or more subscriber terminals to communicate with the satellite. Communication from the user to the satellite, and from satellite to user, is funneled through the identified subscriber terminal, either directly or indirectly through other subscriber terminals.

Figure 16:
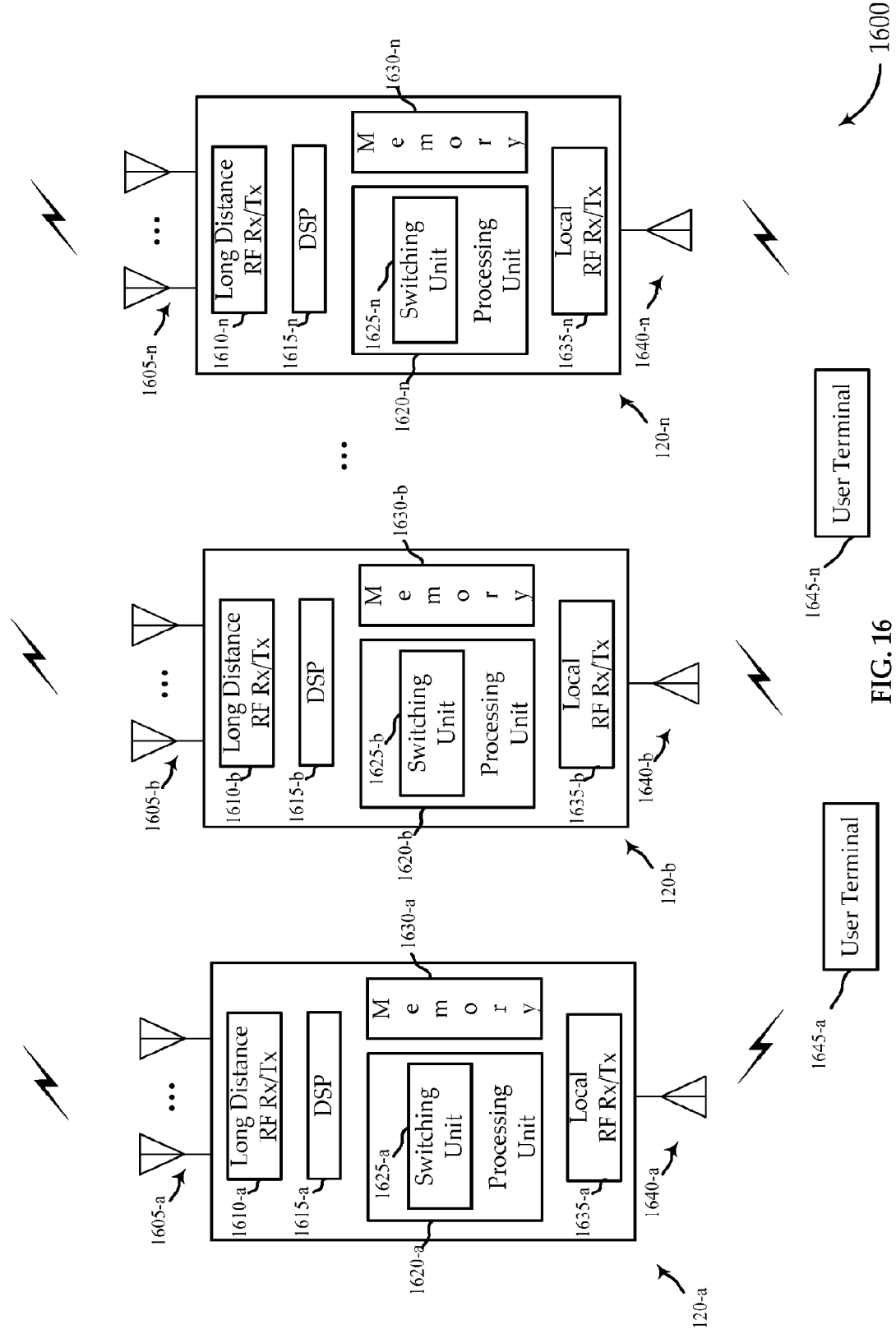
FIG. 16 shows a block diagram illustrating a system that includes a number of subscriber terminal devices each of which is configured to receive the signals from one or more satellites according to embodiments of the invention.

Referring to FIG. 16, a block diagram is shown illustrating an example of a system including a number of subscriber terminal devices 1020, each of which is configured to receive the signals 1120 of FIG. 11. It is worth noting that a variety of configurations for the subscriber devices is possible in other embodiments and the devices 1020 shown represent but one example thereof. Each subscriber terminal may, therefore, be any device 1020 for receiving signals depicted in FIG. 10. In one embodiment, each device 1020 includes a number of long distance antennas (or antenna elements) 1605 to receive signals from, or transmit signals to, satellites 105 (and, possibly, a base station 123). In this embodiment, each device has two or more such antennas. Each set of antennas may be made up of a number of different types or configurations of antennas, some of which are more efficient for different signals or conditions. The antennas in this embodiment may be diverse (e.g., through spatial, angular, or polarization diversity).

Each device 1020 includes long distance RF Rx/Tx components 1610 (including, e.g., a LNA, mixer for downconversion, and A/D converter), which receive and digitize a signal 1120 received via antenna 1605. The digitized signal is then processed by a DSP 1615, producing a data stream to be passed to a processing unit 1620 and memory 1630. Particular receive chains for each antenna may also be configured to perform beam forming. The data stream may then be processed further and, possibly, forwarded by the other components (not shown) of the device 1020. Parallel components may, essentially, perform the reverse process on the transmit side, as evident to those skilled in the art.

Also coupled with each device 1020 is one or more short distance wireless antenna(s) 1640 (e.g., utilizing WiFi, Wireless USB, ZigBee, Bluetooth, IRDa, etc.). Each device also includes a local RF Rx/Tx unit 1635 (including, e.g., an amplifier, mixer, and A/D and D/A converters). Wireless signals can be received (or transmitted) via the local RF Rx/Tx unit 1635 and short-distance antenna 1640. The processing unit 1620 of each device 1020 may receive (or supply) the local data stream.

In one embodiment, each depicted device 1020 is attached to a moving vehicle (e.g., a train). In other embodiments, the devices may be attached to buses, planes, ships, or other large vehicles. Each device 1020 is also in wireless communication locally (e.g., via the local antenna 1640) with at least one other subscriber terminal device 1020, and may also communicate with the user terminals 1645 (e.g., of passengers or other personnel).

The devices 1020 communicate with each other, sharing their channel estimates and other received signal information. In one embodiment, one master device (e.g., terminal 1020-*a*) consolidates the information from remaining devices of the set (1020-*b* to 1020-*n*). In this embodiment, the device 1020-*a* is in unidirectional control over one or more of the other devices of the set (1020-*b* to 1020-*n*). The master device 1020-*a*, using the consolidated information, may identify the device of the set (1020-*a* to 1020-*n*) to connect with the satellite 105.

In another embodiment, the devices (or a subset thereof) form a mesh network, each consolidating the channel estimates and other received signal information from the devices of the set (1020-*a* to 1020-*n*). In this embodiment, the devices (1020-*a* to 1020-*n*), using the consolidated information, may communicate to identify the device of the set (1020-*a* to 1020-*n*) to connect with the satellite 105.

Therefore, an identified device 1020 communicates with the satellite(s) 105, or satellite 105/base station 123, via wireless signals 1025 (e.g., the signals 1120 of FIG. 11). The identified device may, therefore, effectively serve as the interface between satellite(s) 105 and/or base station 123 and the user terminals 1645. The processing unit 1620 of the identified device 1020 includes a switching unit 1625 to lookup addresses for routing purposes.

In one embodiment, each (or perhaps a subset) of the devices (1020-*a* to 1020-*n*) receives signals from the user terminals 1645 local to the device. Each device 1020 receiving wireless data from the user terminals 1645 may then transmit the received data to the identified device 1020 in communication with a satellite 105 for further processing (e.g., transmission to the satellite). In an alternative embodiment, when a particular device is identified, all the user terminals 1645 communicate directly with the identified device 1020, and not through other devices which may have better local connections. Note also that although the above description includes a single device 1020 identified to communicate with the satellite, in other embodiments more than one device 1020 may be in communication with the satellite, or the signals received by the different devices 1020 may be combined in some manner known in the art.

Section VI

A subscriber terminal includes different antennas, of which at least two are specifically configured to receive or transmit different types of satellite signals according to another embodiment of the invention. In one embodiment, a subscriber terminal includes two or more antennas configured to emphasize line-of-site signals, and two or more antennas configured with additional gain for multipath signals. The signal processing for received or transmitted signals is different for each type of antenna. The different types of antennas may have different RF and/or digital signal processing components. Alternatively, the same components may process the signals from the antennas differently based at least in part on the antenna type.

Figure 23:
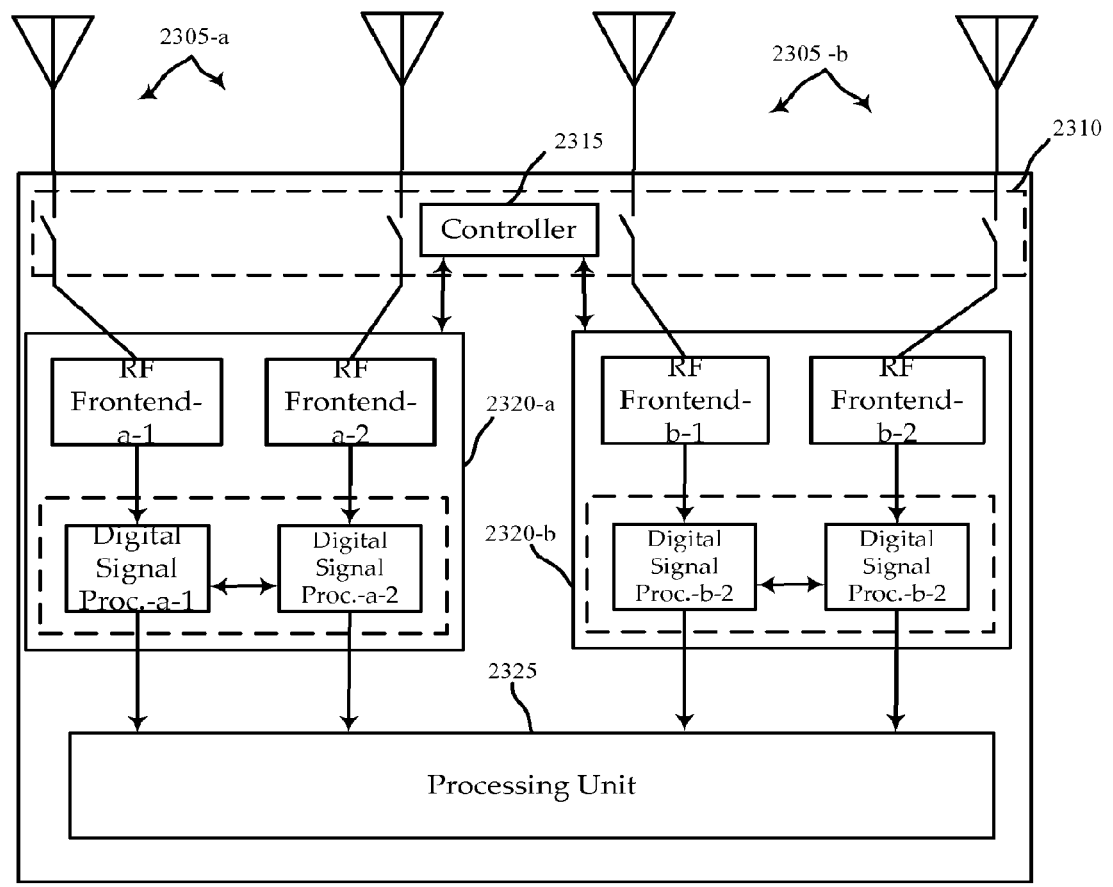
FIG. 23 shows a device that may be used to receive signals shown in FIG. 11 according to another embodiment of the invention.

Referring to FIG. 23, a device 2300 is shown that may be used to receive the signals 1120 of FIG. 11. The device 2300 may, therefore, be the receiver 1120 of FIG. 11. In one embodiment, the device includes a number of antennas (or antenna elements) 2305. In FIG. 23, there are four antennas 2315, but it is worth noting that this is for purposes of example only (i.e., there may be three or more antennas in other embodiments).

The set of antennas is made up of a two or more different types or configurations of antennas, some of which are more efficient for different signals or conditions. In the illustrated embodiment, there are two antennas 2305-*a* of a first type and configuration, and two antennas 2300-*b* of a second type and configuration. One or more of the antennas may be an antenna array. By way of example, in one embodiment, certain antennas may be configured to receive line-of-site satellite signals, while others may be configured to receive and multipath signals. In other embodiments, certain antennas may be configured to cover a particular range of azimuth coverage. The spacing of the antennas may vary depending on the application. The antennas may be of different shapes to accommodate satellite multipath or terrestrial links. Also, there may be different configurations for terrestrial multipath vs. satellite multipath signals, serving the same subscriber terminal 2320. In some embodiments, therefore, the composition, size, spacing, and components of an antenna may be different for the antennas of a given device.

In one embodiment, the device 2300 also includes a set of switches 2310, one or more for each antenna 2305. The switches 2310 are configured, in one embodiment, to couple the signals from the antennas 2305 to a select one of a set of receive chains 2320. The device 2300 in this embodiment may include a first set of receive chains 2320-*a* with a first set of RF and digital signal processing components for the first type of antennas, and a second set of receive chains 2320-*b* with a second set of RF and digital signal processing components for the first type of antennas. All, or only a subset, of the RF components (e.g., LNAs, mixers, DACs, ADCs, etc.) and digital signal processing components for the chains 2320 may be different for each type of antenna, based at least in part on the antenna 2305 type/configuration. Note that, in other embodiments, the number of receive chains may be any subset of the receive antennas 2305 (e.g., 4 of 8, or n of M).

While the description above sets forth an embodiment in which all or a subset of the receive chain components are different for the different antenna types (2305-*a* and 2305-*b*), this need not be the case. For example, the same components may processing the signals from each type of antenna differently based at least in part on the particular antenna type. Thus, a controller 2310 may control different processing blocks (2315-*a* or 2315-*b*) to change the signal processing (e.g., amplification, digital signal processing schemes, etc.) based at least in part on the antenna (2305-*a* or 2305-*b*) type providing the signal(s). However, in this particular embodiment, at least some of the different processing will take place on the same (e.g., shared or distinct) components.

In one embodiment, the switches 2310 may be used to dynamically switch the input of a given receive chain 2320 on and off. The controller 2315 may be configured to control the operation of the switches, and also may control which receive chain 2320 provides the processed data stream to the processing unit. The controller 2315 may receive information from the set of receive chains 2320. The controller 2315 may be preprogrammed to switch randomly or systematically when the channel (actual or estimated) falls below a particular threshold. The controller 2315 may also use previously received channel information from the set of receive chains to select the antenna type configuration (e.g., antennas 2305-*a* or antennas 2305-*b*). The controller may also perform channel monitoring, perhaps directing an inactive receive chain to round robin through the inactive antennas and provide information. The thresholds for switching may be dynamically set depending on the environment. In other embodiments, a subscriber terminal may include different types and configurations of antennas, but the subscriber need not have some or all of the dynamic switching capabilities described above.

Each receive chain 2320 (e.g., with an RF frontend including a LNA, mixer for downconversion, A/D converter, etc.) may receive and digitize a signal from the selected antenna 2305, and then process the digitized signal with a DSP, producing the data stream. Particular receive chains of the set 2320 may also be configured to perform beam forming on the select antenna 2305. The data stream may then be forwarded to and processed by the processing unit 2325 and, possibly, processed by other components (not shown) of the device 2300. The controller 2315 may control which data streams are passed to the processing unit (e.g., where they may be combined).

Although the switching between types/configurations shown is related to a receiver, one skilled in the art will recognize that such a scheme may be applied to a transmitter, as well. In such an embodiment, received signals could aid the controller in estimating the available channels for purposes of switching the transmit antennas. Also, the signal recipients (e.g., the base station 123) could feed back channel information directed at the controller which could provide actual channel information. Note, also, that each receive chain need not be used in all instances (e.g., a smaller subset of the receive chains may be used in certain instances when the signal is particularly strong (e.g., if the SNR or other channel measurement is above a certain threshold)).

Section VII

A device and method are described for scanning inactive antenna signals to identify better channels when dynamically switching between subsets of available antennas according to another embodiment of the invention. For example, in a receiver configured to process signals from only a subset of available antennas, the remaining (i.e., "inactive") antennas may be scanned to identify alternatives. In one embodiment, the switching is based on measurements of received signals from the inactive antennas. The scanning may be adapted to a particular environment, for example, scanning less often for a power limited device with adequate signal strength at the active antennas. In one embodiment, a set of antennas is made up of a number of different types or configurations of antennas, some of which are more efficient for different signals or conditions.

Section VIII

A device and method are described for state-based switching between antennas according to another embodiment of the invention. In one embodiment, the controller for the switching is a state-based controller. In another embodiment, there is state-based scanning of the inactive antenna signals to identify improved channels when dynamically switching between subsets of available antennas. The states may be based, for example, on inputs related to velocity, location, QoS, type of service, time, or other inputs. State tables may be used to identify the states, or the processing associated with particular states.

Figure 17:
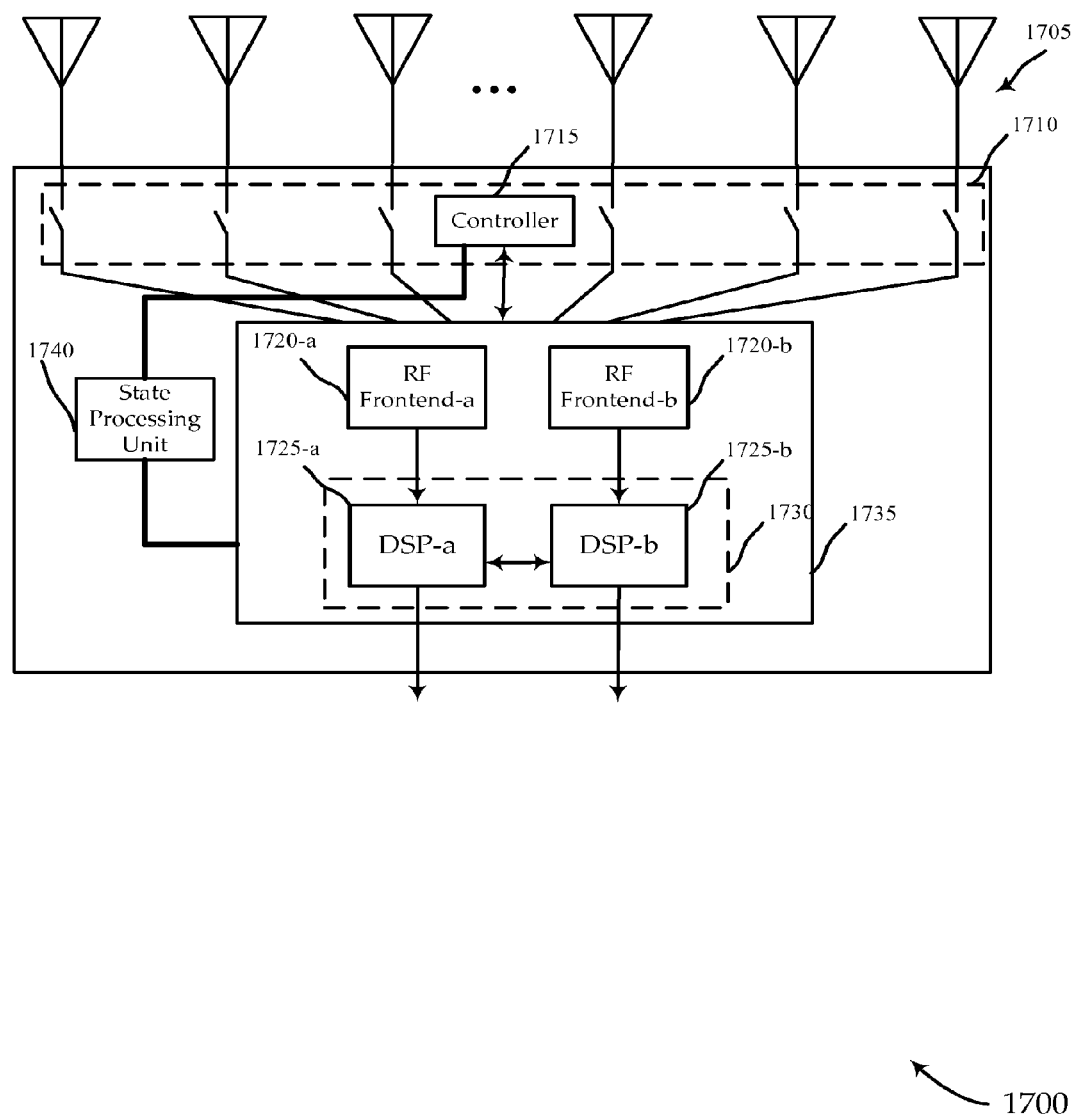
FIG. 17 shows a block diagram of a multi-antenna subscriber terminal according to one embodiment of the invention.

Referring to FIG. 17, a device 1700 is shown which may be used to receive the signals 1120 of FIG. 11. The device 1700 may, therefore, be the receiver 1020 of FIG. 10. In one embodiment, the device includes a number of antennas (or antenna elements) 1705. In this embodiment, there are six antennas 1705, but it is worth noting that this is for purposes of example only (i.e., there may be three or more antennas (or antenna elements) in other embodiments). The set of antennas is, in one embodiment, made up of a number of different types or configurations of antennas, some of which are more efficient for different signals or conditions. The device also includes a set of switches 1710, one or more for each antenna 1705. The switches are configured to couple the signals from the antennas 1705 to a select one of a set of receive chains 1735. The device 1700 in this embodiment includes only two receive chains (i.e., (1) 1720-*a* and 1725-*a*, and (2) 1720-*b* and 1725-*b*). Note that in other embodiments, the number of receive chains may be any subset of the receive antennas 1705 (e.g., 4 of 8, or n of M).

Thus, the switches 1710 are used to dynamically switch the input of a given receive chain between different receive antennas 1705. The device 1700 also includes a controller 1715 which is configured to control the operation of the switches. In this embodiment, the controller 1715 is state-based. Thus, the controller behaves differently depending on its current state (from among a finite number of states). Different inputs may determine the state of the controller (e.g., time, device type, type of service, quality of service, location, velocity, etc.). A transition between states may cause the controller to change its behavior. By way of example, in one embodiment, the controller 1715 behaves differently if it is an urban location (State 1) or rural location (State 2). In one embodiment, therefore, the device includes a state processing unit 1740, in communication with the controller 715 and receiver components 1735. The state processing unit 1740 receives data inputs (e.g., velocity and location attributes), and may determine whether the current state is proper or whether a transition is needed. If a state change is called for, the state processing unit 1740 may communicate the change to the controller 1715 and receiver components 1735.

In this state-based configuration, the controller 1715 may be preprogrammed to switch to particular antennas in a different progression based on state. For example, in rural environments, the LOS-emphasized antennas may be switched to first, whereas the multipath antennas may be favored in an urban setting. The threshold levels for changing between channels may be based on state as well. The controller 1715 may also perform channel monitoring, perhaps directing an inactive receive chain to round robin through the antennas 1705 depending on state. The thresholds for switching could be dynamically set depending on different state parameters.

The controller 1715, based at least in part on state, couples each RF frontend 1720 with a respective antenna 1705. Each RF frontend 1720 (including, e.g., a LNA, mixer for downconversion, A/D converter, etc.) may receive and digitize a signal from the selected antenna 1705. The digitized signal is then processed by a DSP 1725, producing the data stream (note that, although the DSPs 1725 are depicted separately, a single processor 1730 may perform operations for each chain). The RF frontend 1720 and DSPs 1725 may process signals differently based upon state. States related to location and velocity may be particularly applicable, as the processing of these components may be different based on these state issues. Particular receive chains of the set 1735 may also be configured to perform beam forming on the select antenna 1705, based at least in part on a state determination. The data stream may then be processed further and, possibly, forwarded by the other components (not shown) of the device 1700.

Although the dynamic switching shown is related to a receiver, one skilled in the art will recognize that such scheme could be applied to a transmitter, as well. In such an embodiment, state could be of particular used with an RF frontend, for example for power control purposes (e.g., power control margin increases as velocity increases). Received signals could aid the controller in estimating the channel for purposes of switching the transmit antennas. Also, the signal recipients (e.g., the base station 123) could feed back channel information directed at the controller which could provide actual channel information.

Figure 18:
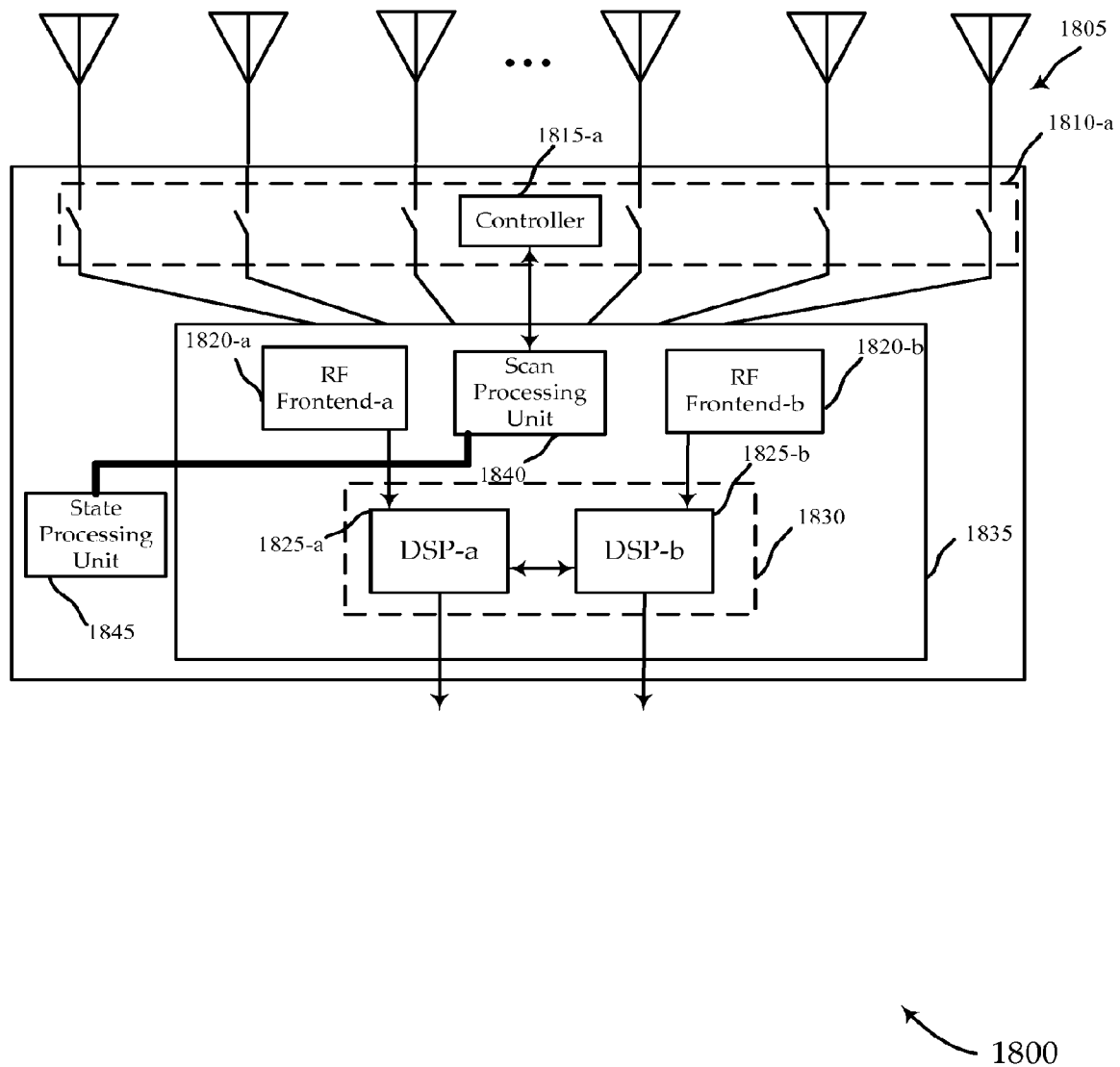
FIG. 18 shows another block diagram of a multi-antenna subscriber terminal according to one embodiment of the invention.

Referring to FIG. 18, an alternative device 1800 is shown which again may be used to receive the signals 1120 of FIG. 11. The device 1800 may, therefore, be the receiver 1020 of FIG. 10. In one embodiment, the device includes numbers of antennas (or antenna elements) 1805. The antennas (or antenna elements) are, in this embodiment, each able to separately receive signals. They may have spatial, angle, or polarization diversity. The device 1800 also includes a set of switches 1810, one or more for each antenna 1805. The switches are configured to couple the signals from the antennas 1805 to a select one of a set of receiver components 1835. The device 1800 in this embodiment includes only two receive chains (i.e., (1) 1820-*a* and 1825-*a*, and (2) 1820-*b* and 1825-*b*), and also includes a scan processing unit 1840 configured to scan inactive antennas. Note that in other embodiments, the number of receive chains may be any subset of the receive antennas 1805 (e.g., 4 of 8, or n of M). Also, the scan processing unit 1840 may be configured to scan more than one antenna simultaneously.

In this embodiment, the device 1800 includes a state processing unit 1740, in communication with the scan processing unit 1840. The state processing unit 1845 receives data inputs (e.g., time, type or quality of service, velocity, and/or location attributes), and may determine whether the current state is proper or if a transition is needed. If a state change is called for, the state processing unit 1845 may communicate the change to the scan processing unit.

Thus, the switches 1810 are used to dynamically switch the input of a given receive chain between different receive antennas 1805. The device 1800 also includes a controller 1815 which is configured to control the operation of the switches. The controller 1815 receives information from the scan processing unit 1840.

Based on state, the scan processing unit 1840 may be configured to perform the scans at all times, periodically, or only at certain times (e.g., scan more regularly when there is heavy voice call traffic). Based on states, the scan processing unit 1840 may be configured to scan less regularly in a power limited device in certain circumstances. The scan processing unit 1840 may be preprogrammed to switch randomly or systematically between channels based on state (e.g., switch to multipath elements first in states related to urban environments). The scan processing unit 1840 may include any combination of amplifiers, downconverters, A/D units, and digital signal processing units to measure the signal from an inactive antenna. The time spent on each antenna may be configured to vary depending on state. State parameters may change adaptively, as well.

Each RF frontend 1820 (including, e.g., a LNA, mixer for downconversion, and A/D converter, etc.) may receive and digitize a signal from the selected antenna 1805. The digitized signal is then processed by a DSP 1825, producing the data stream (note that although the DSPs 1825 are depicted separately, a single processor 1830 may perform operations for each chain). Particular receive chains of the set 1835 may also be configured to perform beam-forming on the select antenna 1805. The data stream may then be processed further and, possibly, forwarded by the other components (not shown) of the device 1800.

It is worth emphasizing that the antennas 1805 may be of different sizes and types. Each configuration may be directed at receiving certain types of signals (e.g., LOS or multipath). Thus, it is clear why certain antennas may be favored in certain states. The scan processing unit 1840 may also be used in conjunction with a device in which each antenna 1805 has additional RF components (e.g., LNA, mixer, downconverter, A/D, etc.).

Figure 19:
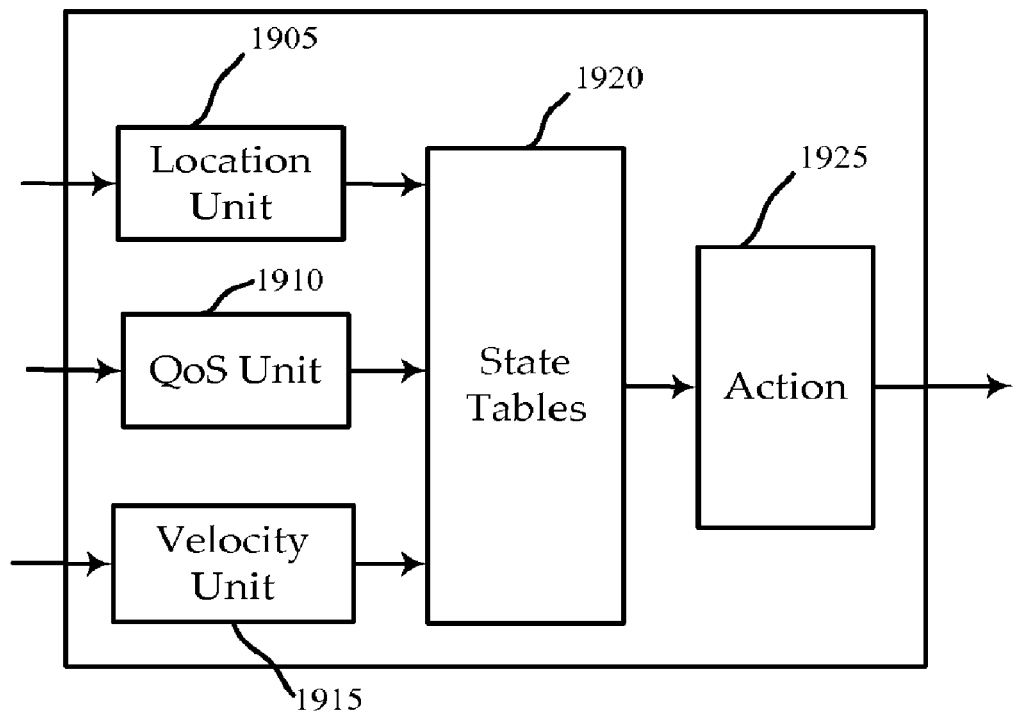
FIG. 19 shows a block diagram illustrating a state processing unit shown in FIGS. 17 and/or 18 according to one embodiment of the invention.

FIG. 19 is a block diagram illustrating the state processing unit 1845 of FIG. 18. This functionality and design may also be found in the state processing unit 1740, 1845 of FIG. 17 or 18. This state processing unit 1845 includes a location unit 1905, a QoS unit 1910, a velocity unit 1915, state table lookup unit 1920, and an action unit 1925. Location data (e.g., geographic coordinates, geographic descriptors, etc.) is received at the location unit. The QoS unit 1910 receives QoS data, and velocity unit 1915 receives velocity data (e.g., from a vehicle, device, or network).

The inputs are forwarded to the state table lookup unit 1920, and the state corresponding to the inputs is identified. If there is a state change, the state change information and any associated actions (e.g., processing changes associated with scanning in that state) are transmitted to the scan processing unit 1840 by an action unit 1925. The scan processing unit 1840 may then log the state change, and modifies its behavior accordingly. The state processing unit 1740, 1845 of FIG. 17 or 18 may function in a similar manner (e.g., transmitting the state change information and/or any associated actions to the relevant units).

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

While the principles of the disclosure have been described above in connection with specific apparatuses and methods, it is to be clearly understood that this description is made only by way of example and not as limitation on the scope of the disclosure.

What is claimed is:

1. A scalable subscriber terminal for bi-directional communication with a gateway through one or more satellites, the scalable subscriber terminal comprising a plurality of antennas and configured to operate in at least a first communication mode, wherein the first communication mode is SIMO mode, prior to switching to a second communication mode, wherein the second communication mode is MIMO mode, wherein:
   the first communication mode comprises communicating with the gateway through a first satellite;
   the second communication mode includes communicating with the gateway through the first satellite and a second transceiver; and
   wherein plurality of antennas of the scalable subscriber terminal receives MIMO operational firmware from the gateway through the first satellite prior to switching to the second communication mode.

2. The scalable subscriber terminal according to claim 1, wherein the first communication mode comprises a SISO mode.

3. The scalable subscriber terminal according to claim 1, wherein the second communication mode comprises a MISO mode.

4. The scalable subscriber terminal according to claim 1, wherein the second transceiver comprises a second satellite.

5. The scalable subscriber terminal according to claim 1, wherein the second transceiver comprises a terrestrial repeater.

6. A method for switching a communication link at a subscriber terminal from a SIMO satellite communication link to a MIMO satellite communication link, the method comprising:
   communicating with a gateway through a first satellite using SIMO techniques;
   receiving an indication of the presence of a second transceiver from the gateway through the first satellite;
   downloading MIMO-compatible firmware to the subscriber terminal from the gateway through the first satellite;
   loading the MIMO-compatible firmware at the subscriber terminal; and
   communicating with the gateway through at least the first satellite and the second transceiver using MIMO techniques.

7. The method according to claim 6, wherein the second transceiver comprises a terrestrial repeater.

8. The method according to claim 6, wherein the second transceiver comprises a second satellite.

9. A satellite communication system for bi-directional communication, the satellite communication system comprising:
   a gateway;
   a first orbital transceiver configured to communicate with the gateway;
   a plurality of subscriber terminals, wherein each of the plurality of subscriber terminals include a plurality of antennas and are configured to communicate with the gateway over the first orbital transceiver using SIMO techniques; and
   a second orbital transceiver configured to communicate with the gateway, wherein the gateway is initially configured to communicate with the plurality of subscriber terminals over the first orbital transceiver; and
   wherein the plurality of subscriber terminals download MIMO operational firmware from the gateway through the first orbital transceiver prior to switching to use MIMO techniques in response to a communication event; and
   wherein the gateway is configured to communicate with the plurality of subscriber terminals over the first orbital transceiver and the second orbital transceiver using MIMO techniques in response to the communication event.

10. The satellite communication system according to claim 9, wherein the communication event comprises establishing a communication link between the gateway and the second orbital transceiver.

11. A method for scaling a satellite communication link from a SIMO link to a MIMO link, wherein the satellite communication link provides communication between a gateway and one or more subscriber terminals through one or more satellites, the method comprising:

communicating with the one or more subscriber terminals through a first communication mode, wherein the first communication mode includes communicating with the one or more subscriber terminals through a first satellite using SIMO techniques;

establishing communication between the gateway and a second satellite;

transmitting MIMO-compatible firmware to the one or more subscriber terminals through the first satellite;

loading the MIMO-compatible firmware at the one or more subscriber terminals; and communicating with the one or more subscriber terminals through a second communication mode, wherein the second communication mode includes communicating with the one or more subscriber terminals through a first satellite and a second satellite using MIMO techniques.

* * * * *